United States Patent
Son et al.

(10) Patent No.: US 10,554,370 B2
(45) Date of Patent: Feb. 4, 2020

(54) WIRELESS COMMUNICATION METHOD USING TRIGGER INFORMATION, AND WIRELESS COMMUNICATION TERMINAL

(71) Applicant: WILUS INSTITUTE OF STANDARDS AND TECHNOLOGY INC., Gyeonggi-do (KR)

(72) Inventors: Juhyung Son, Gyeonggi-do (KR); Jinsam Kwak, Gyeonggi-do (KR); Geonjung Ko, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

(*) Notice: Subject to any disclaimer, the term of this patent is extended or adjusted under 35 U.S.C. 154(b) by 0 days.

(21) Appl. No.: 15/898,226

(22) Filed: Feb. 15, 2018

(65) Prior Publication Data

US 2018/0175991 A1 Jun. 21, 2018

Related U.S. Application Data

(63) Continuation of application No. PCT/KR2016/009253, filed on Aug. 22, 2016.

(30) Foreign Application Priority Data

Aug. 20, 2015 (KR) .................. 10-2015-0117584
Aug. 26, 2015 (KR) .................. 10-2015-0120537

(Continued)

(51) Int. Cl.
*H04W 4/00* (2018.01)
*H04L 5/00* (2006.01)
(Continued)

(52) U.S. Cl.
CPC ............ *H04L 5/0055* (2013.01); *H04L 69/22* (2013.01); *H04W 72/04* (2013.01); *H04W 74/0833* (2013.01)

(58) Field of Classification Search
CPC .......... H04W 72/042; H04W 72/0413; H04W 72/0406; H04L 5/0048; H04L 5/0055
See application file for complete search history.

(56) References Cited

U.S. PATENT DOCUMENTS

2013/0301569 A1   11/2013   Wang et al.
2015/0063320 A1   3/2015    Merlin et al.
(Continued)

FOREIGN PATENT DOCUMENTS

WO   2014/042596   3/2014
WO   2015/066449   5/2015
WO   2017/030428   2/2017

OTHER PUBLICATIONS

International Search Report for PCT/KR2016/009253 dated Dec. 14, 2016 and its English translation from WIPO (published as WO 2017/030428).

(Continued)

*Primary Examiner* — Atique Ahmed
(74) *Attorney, Agent, or Firm* — Ladas & Parry, LLP

(57) ABSTRACT

Provided is a wireless communication terminal that wirelessly communicates with a base wireless communication terminal. The wireless communication terminal includes: a transceiver; and a processor. The processor is configured to receive trigger information and data from the base wireless communication terminal by using the transceiver, and transmits ACK information indicating whether the data is received to the base wireless communication terminal based on the trigger information. The trigger information is information for triggering transmission of the wireless communication terminal.

17 Claims, 21 Drawing Sheets

(30) Foreign Application Priority Data

Sep. 12, 2015 (KR) .................. 10-2015-0129366
Dec. 30, 2015 (KR) .................. 10-2015-0190457

(51) Int. Cl.
*H04L 29/06* (2006.01)
*H04W 72/04* (2009.01)
*H04W 74/08* (2009.01)

(56) References Cited

U.S. PATENT DOCUMENTS

| | | | | |
|---|---|---|---|---|
| 2015/0124690 A1* | 5/2015 | Merlin | ................. | H04L 5/0055 370/312 |
| 2016/0128102 A1* | 5/2016 | Jauh | ................. | H04W 74/0833 370/329 |
| 2016/0143026 A1* | 5/2016 | Seok | ................. | H04W 72/0413 370/329 |
| 2016/0241411 A1* | 8/2016 | Huang | ................. | H04L 12/189 |
| 2016/0302185 A1* | 10/2016 | Sun | ................. | H04W 74/08 |
| 2016/0316458 A1* | 10/2016 | Kwon | ................. | H04L 27/2601 |
| 2016/0330007 A1* | 11/2016 | Cherian | ................. | H04L 5/0055 |
| 2016/0330714 A1* | 11/2016 | Hedayat | ................. | H04W 72/1289 |

OTHER PUBLICATIONS

Written Opinion of the International Searching Authority for PCT/KR2016/009253 dated Dec. 14, 2016 and its English machine translation by Google Translate (published as WO 2017/030428).
Ghosh, Chittabrata et al., "Random Access with Trigger Frames Using OFDMA", IEEE 802.11-15/0875r1, Jul. 14, 2015, slides 1-16, See slides 9, 12-14.

* cited by examiner

WIRELESS COMMUNICATION METHOD USING TRIGGER INFORMATION, AND WIRELESS COMMUNICATION TERMINAL

CROSS-REFERENCE TO RELATED APPLICATIONS

This application is a continuation of International Patent Application No. PCT/KR2016/009253 filed on Aug. 22, 2016, which claims the priority to Korean Patent Application No. 10-2015-0117584 filed in the Korean Intellectual Property Office on Aug. 20, 2015, Korean Patent Application No. 10-2015-0120537filed in the Korean Intellectual Property Office on Aug. 26, 2015, Korean Patent Application No. 10-2015-0129366 filed in the Korean Intellectual Property Office on Sep. 12, 2015, and Korean Patent Application No. 10-2015-0190457filed in the Korean Intellectual Property Office on Dec. 30, 2015, the entire contents of which are incorporated herein by reference.

TECHNICAL FIELD

The present invention relates to a wireless communication method using trigger information and a wireless communication terminal.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel. Therefore, required is a technology capable of efficiently using bandwidths by simultaneously transmitting data between a plurality of terminals and base terminals.

DISCLOSURE

Technical Problem

An object of the present invention is to provide an efficient wireless communication method using trigger information and a wireless communication terminal.

Especially, an object of the present invention is to provide a wireless communication method that supports communication with a plurality of wireless communication terminals using trigger information and a wireless communication terminal.

Technical Solution

According to an embodiment of the present invention, a wireless communication terminal that wirelessly communicates with a base wireless communication terminal includes: a transceiver; and a processor, wherein the processor is configured to receive trigger information and data from the base wireless communication terminal through the transceiver, and transmit ACK information indicating whether the data is received to the base wireless communication terminal based on the trigger information, wherein the trigger information is information for triggering transmission of the wireless communication terminal.

The processor may be configured to obtain the trigger information from an MAC header of a MAC Protocol Data Unit (MPDU) transmitted from the base wireless communication terminal.

The processor may be configured to obtain information on a Resource Unit (RU) allocated to the wireless communication terminal from the trigger information, and transmit the ACK information based on the information on the RU allocated to the wireless communication terminal.

The processor may be configured to obtain length information indicating a length of a PLCP Protocol Data Unit (PPDU) including the ACK information from the trigger information, and transmit the ACK information based on the length information.

The processor may be configured to transmit the ACK information and data to the base wireless communication terminal based on the length information.

The processor may be configured to transmit data to the base wireless communication terminal based on a remaining length excluding a length required for transmission of the ACK information from a length indicated by the length information.

The processor may be configured to receive an Aggregate-MPDU (A-MPDU) including a plurality of MPDUs through the transceiver, wherein the A-MPDU may include a trigger MPDU including the trigger information and a data MPDU including the data, wherein the trigger MPDU may be a first MPDU among a plurality of MPDUs included in the A-MPDU.

The A-MPDU may further include a trigger MPDU including the trigger information in addition to the trigger MPDU.

The trigger information may include information indicating one or more RUs allocated to a random access, wherein the processor may be configured to obtain a counter value randomly within a predetermined range, and determine whether to perform a random access based on the counter value and the number of the one or more RUs allocated to the random access.

When a random access is determined, the processor may be configured to randomly access any one of the one or more RUs allocated to the random access.

According to an embodiment of the present invention, a base wireless communication terminal that wirelessly communicates with a plurality of wireless communication terminals includes: a transceiver; and a processor, wherein the processor may transmit trigger information to the plurality of wireless communication terminals through the transceiver, and receive ACK information indicating whether the data is received from the plurality of wireless communication terminals.

The processor may be configured to insert the trigger information into a MAC header of a MAC Protocol Data Unit (MPDU).

The trigger information may include information on a resource unit (RU) allocated to each of the plurality of wireless communication terminals.

The trigger information may include length information indicating a length of a PLCP Protocol Data Unit (PPDU) including the ACK information.

The processor may be configured to transmit an Aggregate-MPDU (A-MPDU) including a plurality of MPDUs through the transceiver, wherein the A-MPDU may include a trigger MPDU including the trigger information and a data MPDU including the data, wherein the trigger MPDU may be a first MPDU among the plurality of MPDUs included in the A-MPDU.

The A-MPDU may further include a trigger MPDU including the trigger information in addition to the trigger MPDU.

The processor may be configured to transmit the trigger MPDU and the data MPDU using a different Modulation & Coding Scheme (MCS) by using the transceiver.

According to an embodiment of the present invention, a method of operating a wireless communication terminal that wirelessly communicates with a base wireless communication terminal includes: receiving trigger information and data from the base wireless communication terminal; and transmitting ACK information indicating whether the data is received to the base wireless communication terminal based on the trigger information, wherein the trigger information may be information for triggering transmission of the wireless communication terminal.

The receiving of the trigger information and the data may include obtaining the trigger information from a MAC header of a MAC Protocol Data Unit (MPDU) transmitted from the base wireless communication terminal.

The obtaining of the trigger information from the MAC header may include obtaining information on a Resource Unit (RU) allocated to the wireless communication terminal from the trigger information, wherein the transmitting of the ACK information may include transmitting the ACK information based on the information on the RU allocated to the wireless communication terminal.

Advantageous Effects

An embodiment of the present invention provides an efficient wireless communication method and a wireless communication terminal using trigger information.

In particular, an embodiment of the present invention provides a wireless communication method and a wireless communication terminal that support communication with a plurality of wireless communication terminals using trigger information.

DESCRIPTION OF DRAWINGS

FIG. 7 shows a problem that may occur when an access point according to an embodiment of the present invention transmits an A-MPDU including a trigger MPDU to a plurality of stations.

FIG. 17 shows a method of setting an ACK policy when a wireless communication terminal transmits data through a cascading sequence according to an embodiment of the present invention.

MODE FOR CARRYING OUT THE INVENTION

Figure 1:
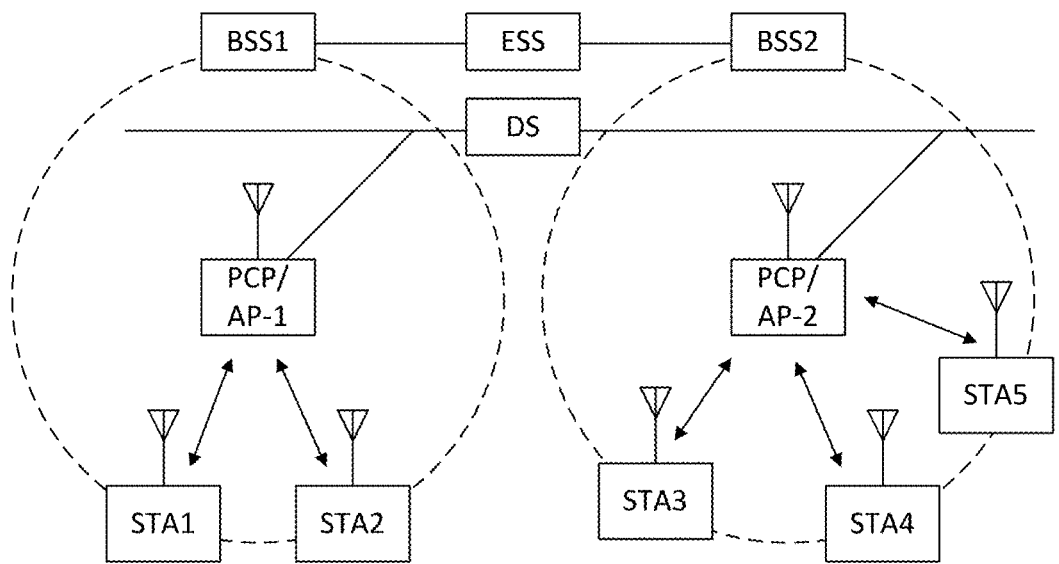
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2015-0117584, Nos. 10-2105-0120537, Nos. 10-2105-0129366, and Nos. 10-2105-0190457 filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
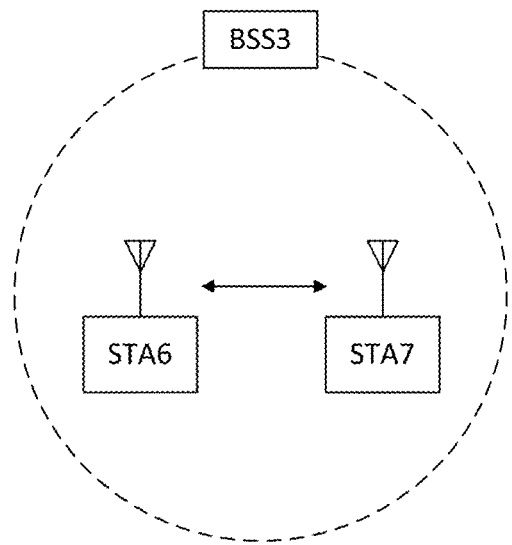
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
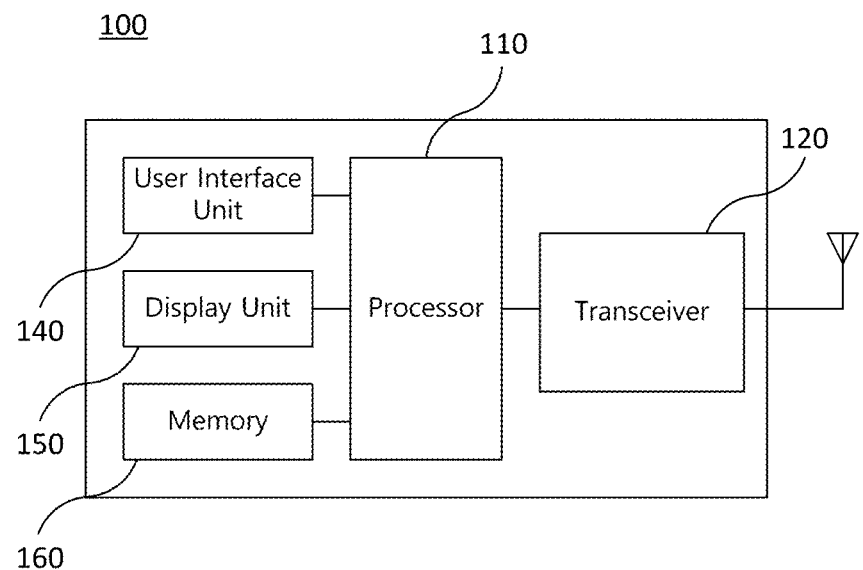
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data.

The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
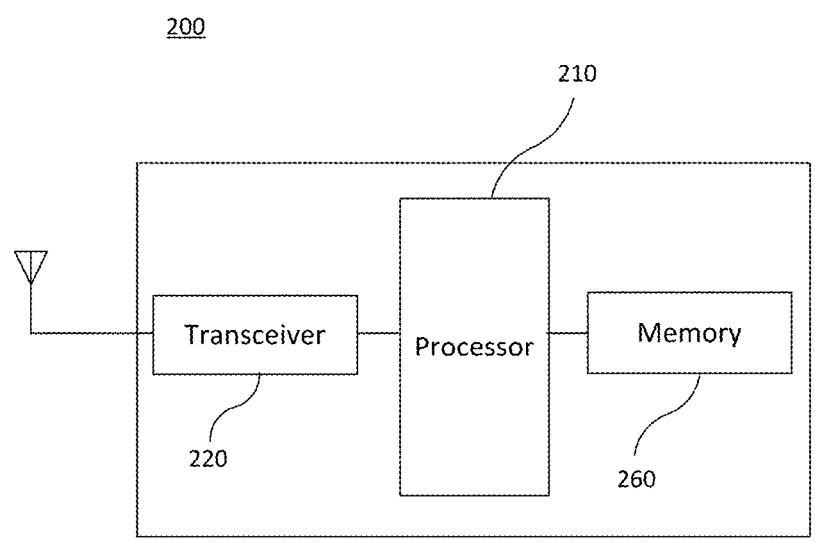
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
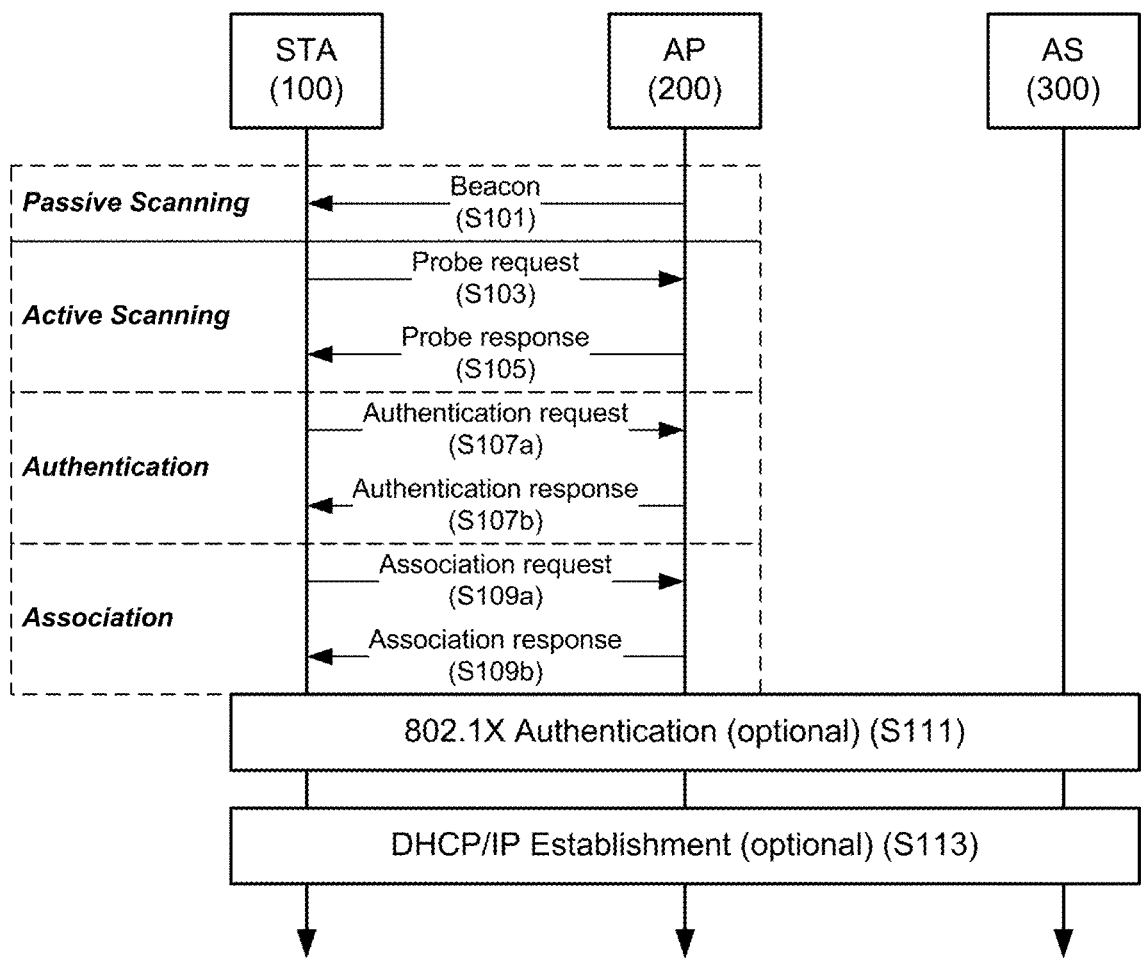
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When data is transmitted using Orthogonal Frequency Division Modulation (OFDMA) or Multi Input Multi Output (MIMO), any one wireless communication terminal may transmit data to a plurality of wireless communication terminals simultaneously. Also, any one wireless communication terminal may simultaneously receive data from a plurality of wireless communication terminals. At this time, any one of the wireless communication terminals may transmit the trigger information triggering the data transmission of the plurality of wireless communication terminals. The trigger information may include information on transmission resources allocated to a plurality of wireless communication terminals. A method of transmitting and receiving control information including trigger information will be described with reference to FIGS. 6 to 23.

For convenience of description, any one wireless communication terminal that communicates simultaneously with a plurality of wireless communication terminals is referred to as a first wireless communication terminal and a plurality of wireless communication terminals that simultaneously communicate with the first wireless communication terminal are referred to as a plurality of second wireless communication terminals. In addition, the first wireless communication terminal may be referred to as a base wireless communication terminal (device). In addition, the first wireless communication terminal may be a wireless communication terminal that allocates a communication medium resource and performs scheduling in communication with a plurality of wireless communication terminals. Specifically, the first wireless communication terminal may perform the role of a cell coordinator. At this time, the first wireless communication terminal may be the access point 200. In addition, the second wireless communication terminal may be the station 100 associated with the access point 200. In a specific embodiment, the first wireless communication terminal may be a wireless communication terminal that allocates a communication medium resource and performs scheduling in an independent network, such as an ad-hoc network, which is not connected to an external distribution service. In addition, the first wireless communication terminal may be at least one of a base station, an eNB, and a transmission point TP.

The first wireless communication terminal may transmit data to the plurality of second wireless communication terminals. At this time, the first wireless communication terminal may transmit one aggregate frame (Aggregate-MPDU, A-MPDU) including a plurality of MPDUs to the second wireless communication terminal. With reference to FIGS. 6 to 16, a method of transmitting trigger information through the A-MPDU will be described. The MPDU may be referred to herein as a MAC frame or a frame.

Figure 6:
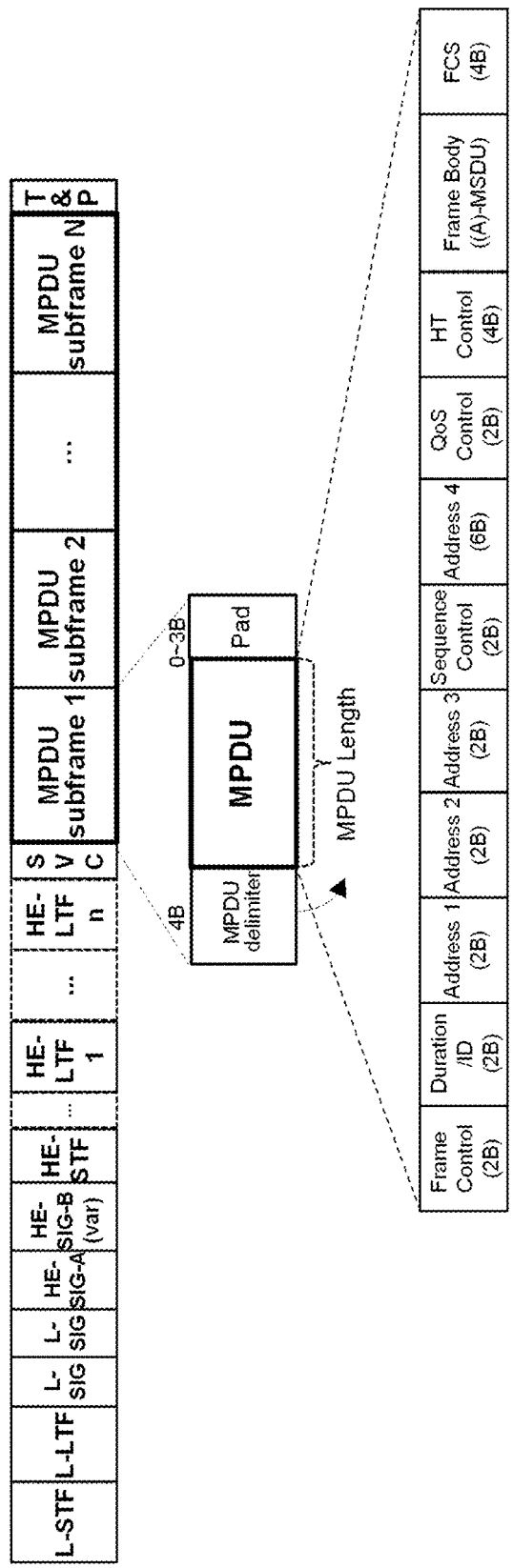
FIG. 6 shows a structure of an A-MPDU according to an embodiment of the present invention.

FIG. 6 shows a structure of an A-MPDU according to an embodiment of the present invention.

MPDU is the data processing unit of the Mac layer. Specifically, the MPDU includes an MAC header and an FCS for verifying whether there is an error in an MSDU or an aggregate MSDU (A-MSDU), which is a data processing unit of an upper layer. The A-MPDU includes a plurality of MPDUs, and includes a delimiter for distinguishing a plurality of MPDUs and a pad for adjusting a transmission length.

The delimiter includes an End-of-Frame (EOF) field indicating whether the MPDU is the last MPDU, an MPDU Length field indicating a length of the MPDU, a CRC field, and a signature field.

Also, when the A-MPDU includes a maximum of N MPDUs, the value indicated by the bitmap of the Block Ack (BA) indicating whether or not each of the plurality of MPDUs included in the A-MPDU is received may be N. In a specific embodiment, N may be 64 or 256.

The PLCP Protocol Data Unit (PPDU) for transmitting the A-MPDU includes a PHY header indicating information related to the physical layer. The PHY header includes an L-SIG field including information decodable by the legacy wireless communication terminal.

The L-SIG field includes an L-Rate field and an L-Length field. The L-Rate field and the L-Length field indicate information on the duration of the PPDU including the L-SIG field. Specifically, when the L-Rate is 6 Mbps, which is the minimum rate of the OFDM frame, the maximum number of symbols that L-Length may represent is 1365 or 1366 symbols. Since OFDM takes 4 us per symbol, the L-Rate/L-Length field may represent a duration of 5.460 ms or 5.464 ms at most. Since the legacy wireless communication terminal may decode the L-SIG, the legacy wireless communication terminal may calculate the duration of the PPDU after the L-SIG based on the L-Rate field and the L-Length field. Accordingly, the legacy wireless communication terminal does not access the corresponding channel during the PPDU duration after the L-SIG. Therefore, the wireless communication terminal may prevent the collision with the transmission of the legacy wireless communication terminal through the L-SIG field when transmitting the A-MPDU.

The A-MPDU may include not only a data MPDU including data but also a control MPDU including control information or a management MPDU including management information. In a specific embodiment, the A-MPDU may include at least one of the control MPDU and the management MPDU with the data MPDU. Specifically, the A-MPDU is a kind of data MPDU and control MPDU, and may include a trigger MPDU including trigger information. This will be described with reference to FIG. 7.

Figure 7:
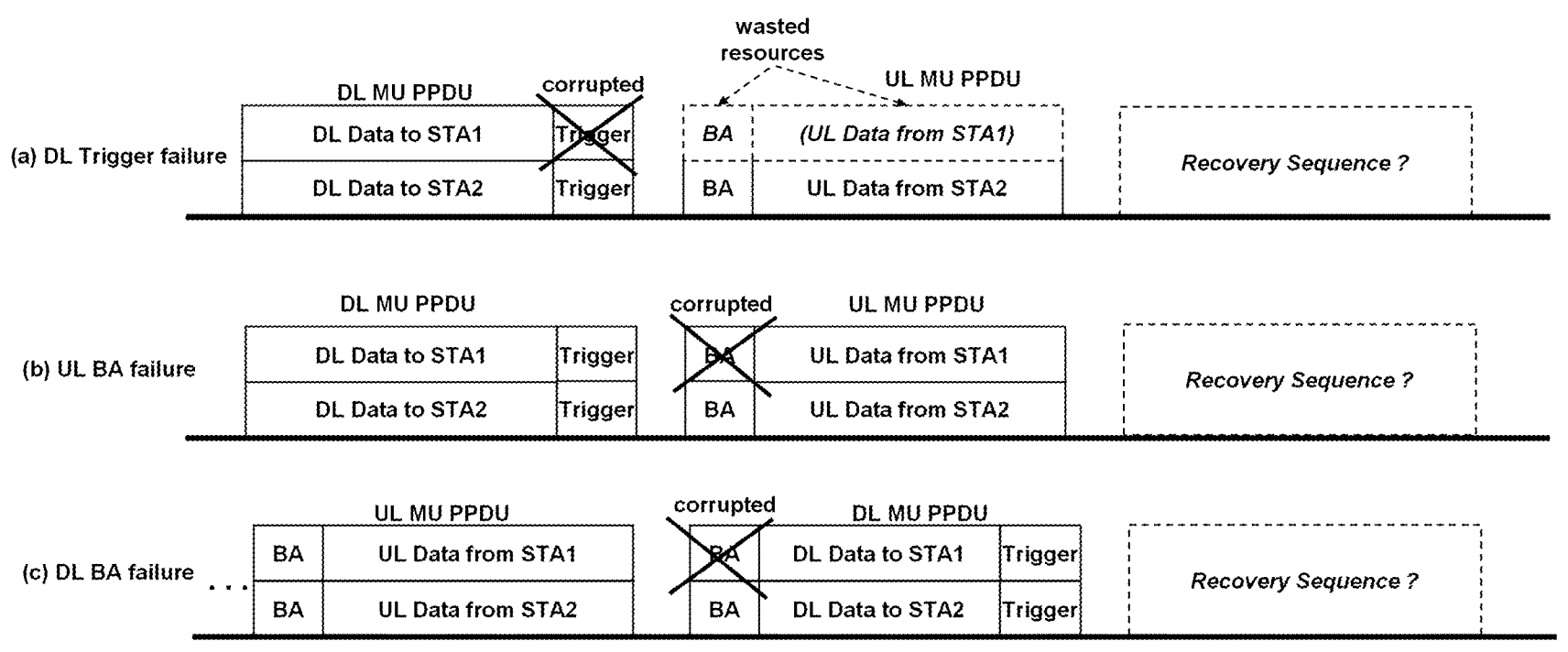

FIG. 7 shows a problem that may occur when an access point according to an embodiment of the present invention transmits an A-MPDU including a trigger MPDU to a plurality of stations.

The first wireless communication terminal may transmit the trigger information for triggering the data transmission of each of the plurality of second wireless communication terminals while transmitting data to the plurality of second wireless communication terminals. Specifically, the first wireless communication terminal may transmit the data MPDU and the trigger MPDU together through the A-MPDU.

Also, each of the first wireless communication terminal and the second wireless communication terminal may transmit an ACK MPDU indicating whether data is received through the A-MPDU together with the data MPDU.

In this way, when the wireless communication terminal transmits the data MPDU and the control MPDU through the A-MPDU and the transmission of the control MPDU fails, the efficiency of the wireless communication may deteriorate.

For example, as in the embodiment of FIG. 7(a), the access point transmits the A-MPDU including the trigger frame (MPDU) together with the data MPDU while transmitting a Down Link (DL) Multi-User (MU) PPDU to the first station STA1 and the second station STA2. At this time, if the first station STA1 fails to receive the trigger MPDU, the wireless communication resources allocated to the first station STA1 are wasted. Also, the first station STA1 loses transmission opportunity. Therefore, in such a case, the access point must grant the transmission opportunity to the first station STA1 again.

Further, when the first station STA1 transmits data and a BA MPDU together as in the embodiment of FIG. 7 (b), the access point may not receive the BA MPDU. Therefore, it is necessary for the access point to solicit BA frame transmission by transmitting a BA Request (BAR) frame.

Also, as in the embodiment of FIG. 7C, after receiving the Up Link (UL) MU PPDU from the first station STA1 and the second station STA2, the access point transmits the A-MPDU including the BA MPDU for the received UL MU PPDU to the first station STA1 and the second station STA2 when transmitting the DL MU PPDU. At this time, the first station STA1 may not receive the BA MPDU transmitted from the access point. Therefore, the first station STA1 needs to transmit the BAR MPDU to the access point to solicit the transmission of the BA frame.

In such a way, if the transmission of the control frame transmitted through the A-MPDU fails, an additional recovery procedure is required. When the wireless communication terminal performs the additional recovery procedure, the transmission efficiency of the wireless communication terminal is lowered. A wireless communication method for increasing the transmission success rate of a control frame will be described with reference to FIGS. 8 to 16.

Figure 8:
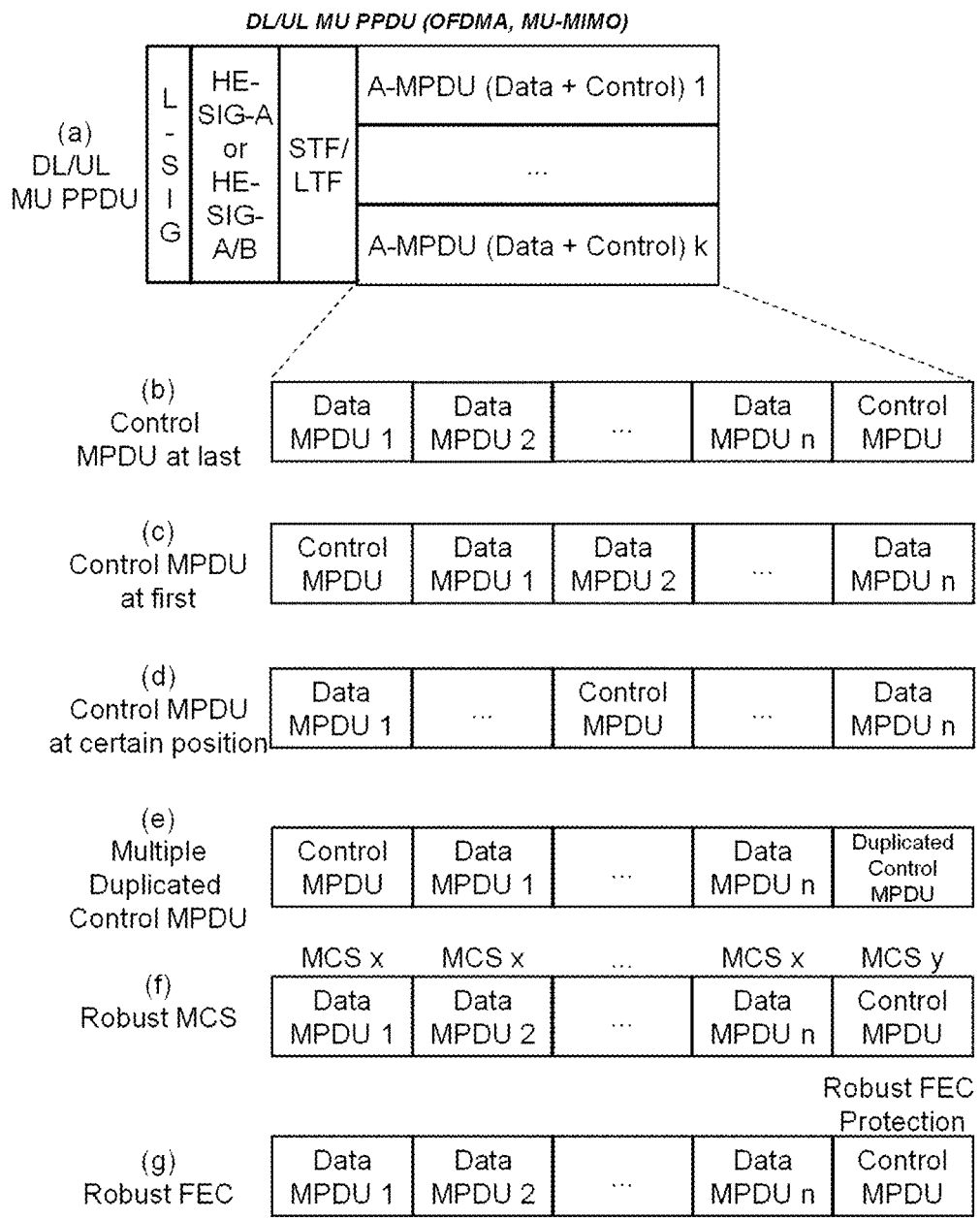
FIG. 8 shows a method of transmitting an A-MPDU to increase the reception success rate of control information by a wireless communication terminal according to an embodiment of the present invention.

FIG. 8 shows a method of transmitting an A-MPDU for increasing the success rate of receipt of control information by a wireless communication terminal according to an embodiment of the present invention.

As described above, the wireless communication terminal may transmit the A-MPDU including the data MPDU and the control MPDU (or the management MPDU). Specifically, when transmitting a DL MU PPDU or an UL MU PPDU as shown in FIG. 8(a), the wireless communication terminal may transmit an A-MPDU including a data MPDU and a control MPDU. At this time, the control MPDU may be the trigger MPDU described above. At this time, the wireless communication terminal may increase the transmission success rate of the control frame through the embodiment of the present invention.

The wireless communication terminal may determine the transmission order of the control MPDU among the plurality of MPDUs included in the A-MPDU differently from the transmission order of the data MPDU. Specifically, the wireless communication terminal may transmit the control MPDU last among the plurality of MPDUs included in the A-MPDU as in the embodiment of FIG. 8(b).

In another specific embodiment, the wireless communication terminal may transmit the control MPDU first among the plurality of MPDUs included in the A-MPDU as in the embodiment of FIG. 8(c). At this time, the control MPDU may be a trigger MPDU or a BA MPDU as described above. In addition, when the A-MPDU includes both the trigger MPDU and the BA MPDU, the wireless communication terminal may transmit the BA MPDU as the first MPDU. The wireless communication terminal receives training fields such as HE-STF and HE-LTF, estimates the channel based on the training field, and performs Automatic Gain Control (AGC). Therefore, as the time passes after receiving the training signal, the reception accuracy of the wireless communication terminal becomes poor. Therefore, when transmitting the first of the plurality of MPDUs included in the A-MPDU, the wireless communication terminal may increase the transmission success rate of the control MPDU.

In another specific embodiment, the wireless communication terminal may determine the order of transmitting the control MPDU according to the transmission success rate for each transmission order of the plurality of MPDUs included in the A-MPDU as in the embodiment of FIG. 8(d). The wireless communication terminal may determine which MPDU of the plurality of MPDUs included in the A-MPDU fails to be transmitted through the BA frame. Therefore, the wireless communication terminal may determine the transmission success rate for each transmission order of the plurality of MPDUs included in the A-MPDU. After determining the transmission success rate for each transmission order of the plurality of MPDUs, the wireless communication terminal may transmit the control MPDUs in a transmission order with a high transmission success rate.

The wireless communication terminal may repeatedly transmit the control MPDU in the A-MPDU as in the embodiment of FIG. 8(e). When the wireless communication terminal repeatedly transmits the same control MPDU, the transmission success rate of the corresponding control MPDU increases. In addition, the control MPDU including the control information does not have a larger MPDU size than the data MPDU. Therefore, the control MPDU is repeatedly transmitted, so that the occurring overhead is small.

The wireless communication terminal may perform the method of modulating the control MPDU included in the A-MPDU differently from the method of modulating the data MPDU included in the A-MPDU. In a specific embodiment, when transmitting the control MPDU as in the embodiment of FIG. 8(f), the wireless communication terminal may use a more robust MCS than the MCS used to transmit the data MPDU. To explain the concrete wireless communication operation, FIGS. 9 and 10 will be described first.

Figure 9:
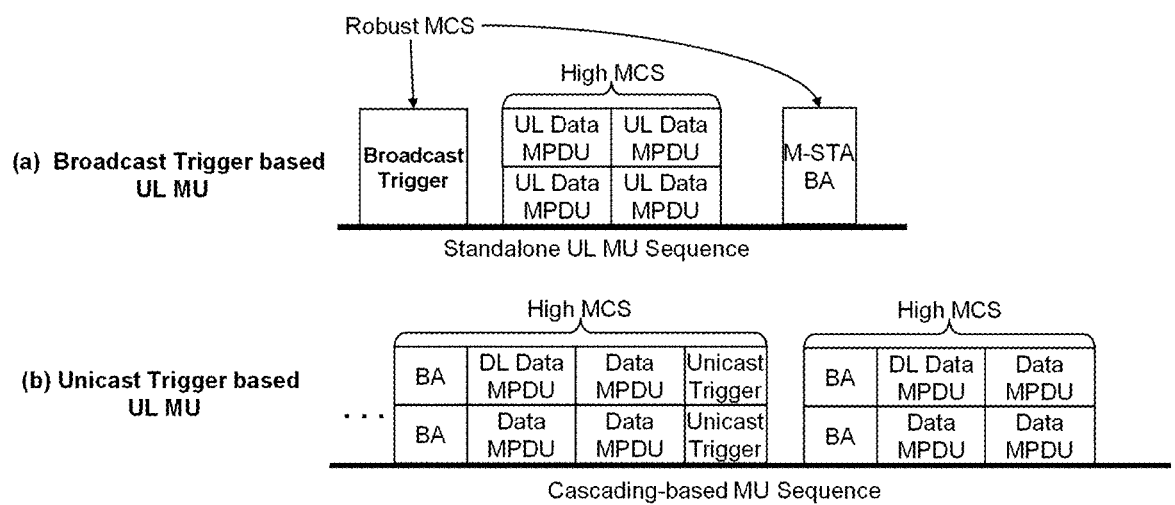
FIG. 9 shows a method of setting an MCS in the same manner as an A-MPDU including only a data MPDU when a wireless communication terminal according to an embodiment of the present invention transmits an A-MPDU including a control MPDU.

FIG. 9 shows a method of setting an MCS in the same manner as an A-MPDU including only a data MPDU when a wireless communication terminal according to an embodiment of the present invention transmits an A-MPDU including a control MPDU.

As in the embodiment of FIG. 9(a), when a station transmits data to an access point, the station may use a high rate MCS to increase the data transmission rate. When transmitting a control frame, i.e., a trigger MPDU, and a multi-station BA (M-STA BA) MPDU, the access point may use a more robust MCS than the MCS used for data transmission in order to increase the transmission success rate.

However, as in the embodiment of FIG. 9(b), when an access point and a station transmit an A-MPDU including a data MPDU and a control MPDU together, the access point and the station use a high-rate MCS to optimize the transmission of data MPDUs. Therefore, the probability of occurrence of transmission failure of the control MPDU increases. Therefore, when transmitting the control MPDU, the wireless communication terminal may use a more robust MCS than the MCS used to transmit the data MPDU.

In a specific embodiment, the wireless communication terminal may transmit the control MPDU in a fixed order to the predetermined MCS. Accordingly, the wireless communication terminal may not transmit additional information signaling the MCS of the control MPDU. In another specific embodiment, the wireless communication terminal may signal at least one of the MCS used for transmitting the control MPDU and the position of the control MPDU in the A-MPDU through the delimiter included in the A-MPDU. In another specific embodiment, the wireless communication terminal may transmit an OFDM symbol of a predetermined location of the PPDU to a fixed MCS. At this time, the fixed MCS may be a relatively robust MCS, and the wireless communication terminal may transmit the control MPDU through an OFDM symbol of a predetermined location.

However, when the wireless communication terminal uses a more robust MCS than the MCS used to transmit the data MPDU when transmitting the control MPDU, the wireless communication terminal may change the MCS by each OFDM symbol unit. In such a case, the wireless communication terminal needs to add padding to the MPDU. This will be described with reference to FIG. 10.

Figure 10:
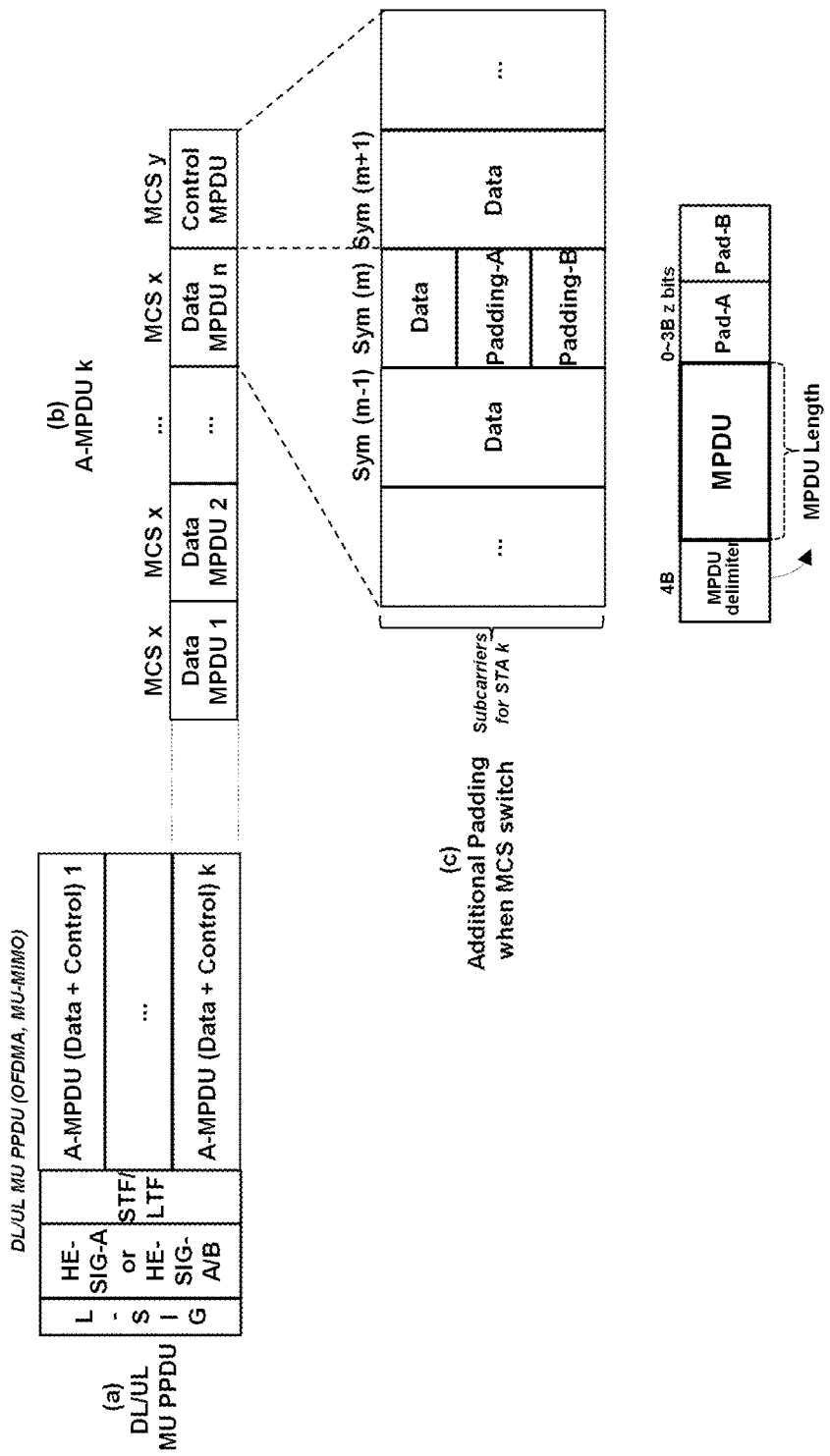
FIG. 10 shows that a wireless communication terminal according to an embodiment of the present invention adds padding to an MPDU included in an A-MPDU.

FIG. 10 shows that a wireless communication terminal according to an embodiment of the present invention adds padding to an MPDU included in an A-MPDU.

The wireless communication terminal may transmit the A-MPDU including the control MPDU and the data MPDU together as shown in FIG. 10(a). At this time, the wireless communication terminal may transmit the control MPDU and the data MPDU to different MCSs as shown in FIG. 10(b).

The wireless communication terminal constructs a PPDU for each OFDM symbol and communicates, so that the MCS may be changed for each OFDM symbol. Therefore, in order to transmit the control MPDU and the data MPDU to different MCSs, the wireless communication terminal may add an additional padding in addition to the padding (called Padding-A) between 0 and 3 bytes added for each MPDU in order for transmission in units of 4 bytes. At this time, the additional padding is called Padding-B.

The wireless communication terminal may obtain the length of the Padding-A through the length of the MPDU signaled by the MPDU delimiter. In the case of Padding-B, which is added for the MCS change per MPDU, the time point that the combination of the data of the corresponding MPDU subframe and the Padding-A ends may not fill the OFDM symbol as shown in FIG. 10(c). The wireless communication terminal may grasp the amount of data remaining to the nearest OFDM symbol boundary, and thus may know the length of Padding-B. Therefore, there is no need for separate signaling for the length of Padding-B.

Referring back to FIG. 8, the operation of the wireless communication terminal according to the embodiment of the present invention will be described.

In another specific embodiment, when transmitting the control MPDU as in the embodiment of FIG. 8(g), the wireless communication terminal may use a more robust FEC code than the FEC code used when transmitting the data MPDU. In addition, the wireless communication terminal may apply the FEC code to the transmission of at least one of the delimiters for distinguishing the MAC header from the control MPDU for protection of the control MPDU.

In relation to the embodiments described with reference to FIGS. 8 to 10, the wireless communication terminal changes the transmission method of the control MPDU included in the A-MPDU. The wireless communication terminal may increase the control information transmission probability by transmitting the control information through the MAC header instead of the control MPDU. This will be described with reference to FIGS. 11 to 14.

Figure 11:
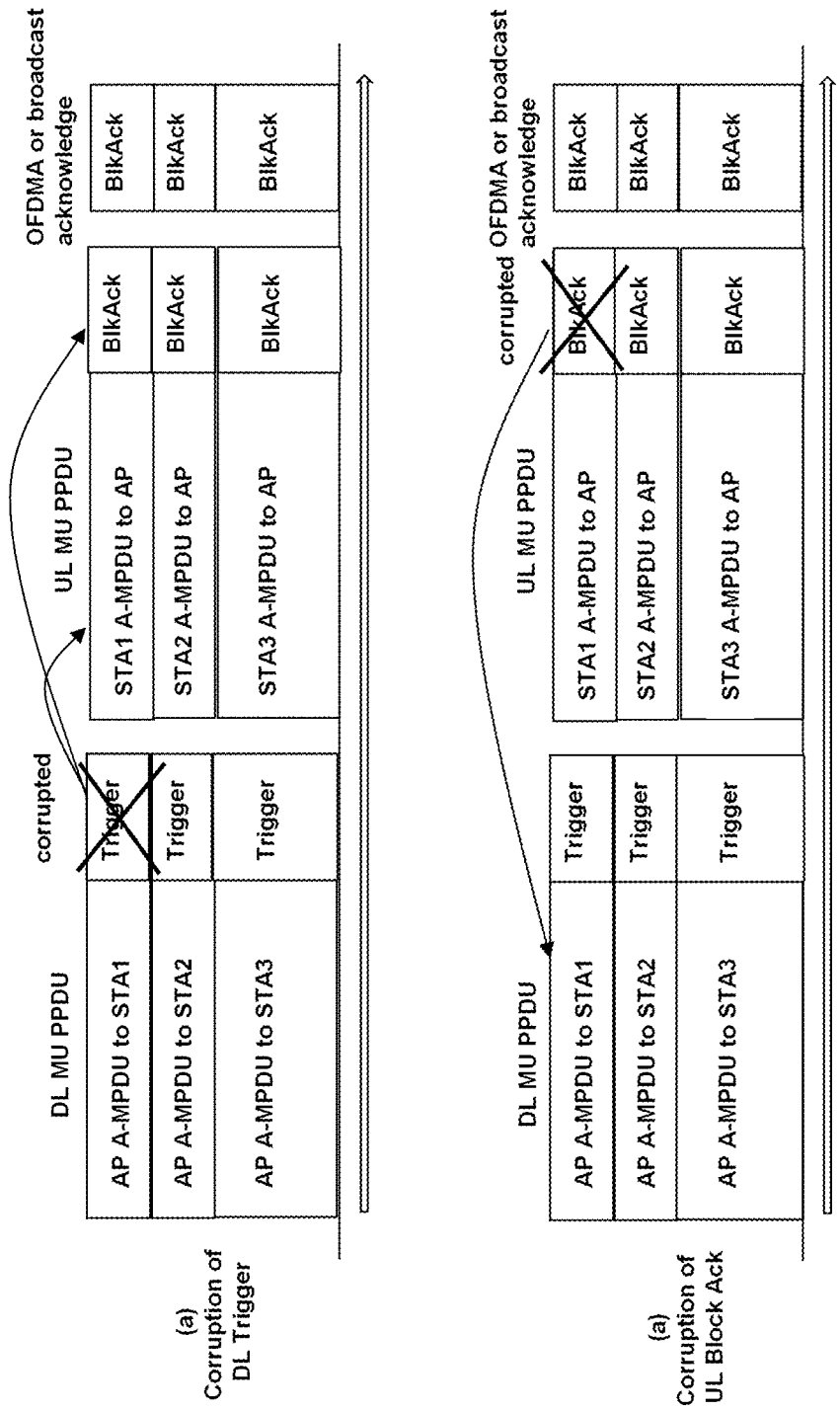
FIG. 11 shows that a wireless communication terminal according to an embodiment of the present invention transmits control information through a MAC header.

FIG. 11 shows that a wireless communication terminal according to an embodiment of the present invention transmits control information through a MAC header.

The wireless communication terminal may transmit control information through the MAC header included in the DL MPDU or the UL MPDU. Specifically, the wireless communication terminal may transmit control information through the MAC header of one or more MPDUs included in the DL/UL A-MPDU. At this time, the control information may be transmitted by the number of MPDUs included in the A-MPDU. When control information is transmitted through the MAC header of a plurality of MPDUs, when any one MPDU among a plurality of MPDUs included in the A-MPDU is successfully transmitted, the control information included in the MAC header of the corresponding MPDU is also successfully transmitted. Therefore, when the control information is transmitted through the MAC header of a plurality of MPDUs included in the A-MPDU, the probability of transmission failure of the control information may be less than the case that the control information is transmitted through the separate control MPDU.

In addition, the MAC header including the control information may be included in the data MPDU including the data. Through this, the wireless communication terminal may transmit data and control information together.

At this time, the control information may be at least one of the above-described trigger information and Block ACK information indicating whether individual MPDUs are received or not. In a specific embodiment, the trigger information included in the MAC header may be part of the trigger information included in the trigger frame. For example, the trigger information included in the MAC header may include information on a Resource Unit (RU) assigned to the wireless communication terminal and information indicating the length of the PPDU that the wireless communication terminal may transmit. The RU indicates a unit frequency band allocated to the second wireless communication terminal by the first wireless communication terminal. In addition, for example, the Block ACK information included in the MAC header may be a part or all of the Block ACK information included in the BA frame.

In the embodiment of FIG. 11(a), the access point AP transmits the A-MPDU including the data MPDU and the trigger MPDU to the first station STA1 to the third station STA3. In addition, the access point AP may transmit the trigger information through the MAC headers of the plurality of MPDUs included in the A-MPDU.

At this time, it is assumed that the transmission of the trigger MPDU that the access point AP transmits to the first station STA1 fails.

However, the first station STA1 obtains the trigger information from the MAC header of the data MPDU included in the A-MPDU transmitted from the access point AP. The first station STA1 transmits the A-MPDU including the BA MPDU and the data MPDU to the access point AP based on the acquired trigger information.

In the embodiment of FIG. 11(b), the access point AP transmits the A-MPDU including the data MPDU and the trigger MPDU to the first station STA1 to the third station STA3.

The first to third stations STA1 to STA3 receive the A-MPDU from the access point AP and acquire the data MPDU and the trigger MPDU. In addition, the first to third stations STA1 to STA3 acquire trigger information from the trigger MPDU.

The first to third stations STA1 to STA3 transmit the A-MPDU including the BA MPDU and the data MPDU to the access point AP based on the acquired trigger information. Also, the first to third stations STA1 to STA3 may transmit Block ACK information through the MAC header of a plurality of MPDUs included in the A-MPDU.

At this time, it is assumed that the transmission of the BA MPDU that the first station STA1 transmits to the access point AP fails.

However, the access point AP acquires Block ACK information of the first station STA1 through the MAC header of the data MPDU included in the A-MPDU transmitted from the first station STA1.

In the embodiment of FIG. 11, although the control information is transmitted through the MAC header of the data MPDU and a separate control MPDU, the control information may be transmitted only through the MAC header of the data MPDU without transmitting the separate control MPDU.

In another specific embodiment, the wireless communication terminal may set the ACK Policy of the data to Delayed Block ACK in preparation for transmission failure of control information when transmitting data and control information at the same time. In this case, the wireless communication terminal may separately request BA from the wireless communication terminal that receives the data MPDU after transmitting the data MPDU. Specifically, the wireless communication terminal may transmit a data MPDU to a plurality of wireless communication terminals, and may transmit a BA Request (BAR) frame for requesting BA from a plurality of wireless communication terminals that receive the data MPDU. In particular, when the wireless communication terminal fails to receive the BA for the data MPDU from the wireless communication terminal that receives the data MPDU, the wireless communication terminal may transmit a BA Request (BAR) frame for requesting the BA from the wireless communication terminal that receives the data MPDU.

The specific format of the trigger information included in the MAC header described with reference to FIG. 11 will be described with reference to FIGS. 12 to 14.

Figure 12:
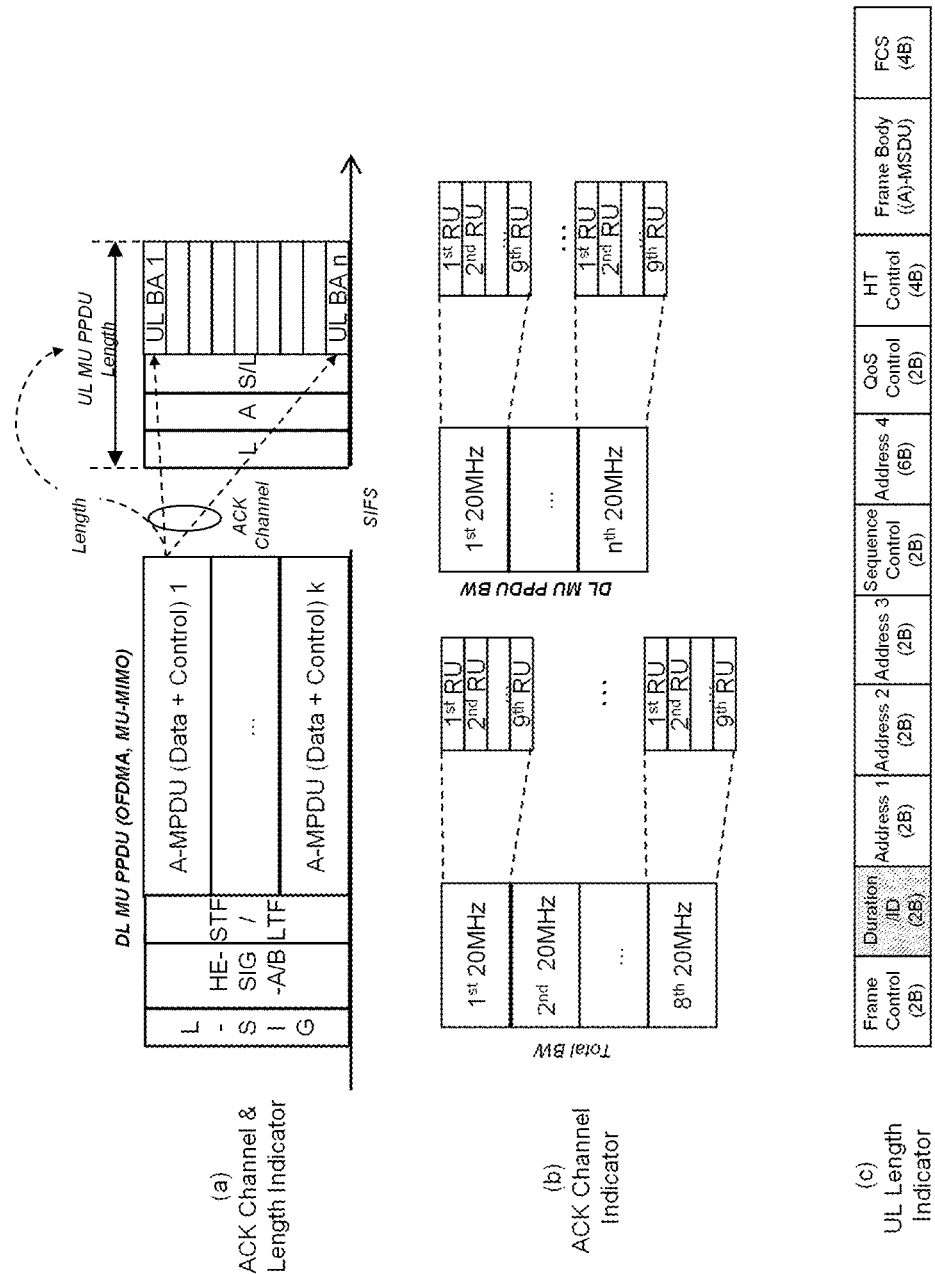
FIG. 12 shows a configuration of an MCA header when a wireless communication terminal according to an embodiment of the present invention transmits control information through a MAC header.

FIG. 12 shows a configuration of an MCA header when a wireless communication terminal according to an embodiment of the present invention transmits control information through a MAC header.

As described above, the wireless communication terminal may transmit the trigger information through the MAC header of the MPDU included in the DL PPDU when transmitting the DL PPDU. In particular, when the first wireless communication terminal transmits a DL MU PPDU to a plurality of second wireless communication terminals, as in the embodiment of FIG. 12(a), trigger information may be transmitted through the MAC header of the MPDU in the A-MPDU included in the DL MU PPDU. At this time, the plurality of second wireless communication terminals may transmit ACK information indicating whether or not the DL MU PPDU is received to the first wireless communication terminal based on the trigger information. Specifically, the plurality of second wireless communication terminals may transmit the UL MU PPDU including the ACK information indicating whether the DL MU PPDU is received to the first wireless communication terminal based on the trigger information.

At this time, the trigger information may include RU allocation information indicating an RU allocated to the second wireless communication terminal for UL PPDU transmission. In addition, the trigger information may include UL PPDU length information indicating the length of UL PPDUs that is transmitted from the second wireless communication terminal.

The RU allocation information may indicate an RU allocated to the second wireless communication terminal as an index. Specifically, the first wireless communication terminal may occupy a frequency band having a bandwidth of 20 MHz, 40 MHz, 80 MHz, and a maximum of 160 MHz. The second wireless communication terminal must transmit the UL PPDU using the RU designated by the first wireless communication terminal in the maximum band occupied by the first wireless communication terminal. At this time, the first wireless communication terminal should be able to divide the 20 MHz bandwidth into 9 RUs and represent 72 or more individual RUs in a maximum 160 MHz bandwidth, as in the embodiment of FIG. 12(b). For this, the RU allocation information may be a 7-bit field indicating the index of the RU.

In another embodiment, the first wireless communication terminal may variably change the bit field indicating the index of the RU under the assumption that the second wireless communication terminal may transmit ACK information on the DL PPDU only within the bandwidth occupied by the DL PPDU. For example, when the first wireless communication terminal transmits the DL PPDU in units of 40 MHz, the second wireless communication terminal may transmit the ACK information on the DL PPDU only within the frequency band in which the DL PPDU is received. In this case, the first wireless communication terminal may indicate an RU assigned to the second wireless communication terminal among 18 RUs as an index. For this, the RU allocation information may be a 5-bit field indicating the index of the RU in the band occupied by the DL PPDU.

The first wireless communication terminal may transmit the UL PPDU length information through the Duration/ID field of the MAC header. Specifically, the first wireless communication terminal may set the value of the Duration/ID field of the MAC header of the DL PPDU transmitted from the first wireless communication terminal to a value obtained by adding the length of the corresponding DL PPDU as well as the length of the UL PPDU to be transmitted from the second wireless communication terminal. In another specific embodiment, the first wireless communication terminal may set the value of the Duration/ID field to a value obtained by adding the length of the DL PPDU, the time interval until the transmission of the UL PPDU starts after the reception of the DL PPDU, and the length of the UL PPDU.

Also, the first wireless communication terminal may transmit the trigger information through the MAC header of all the MPDUs included in the DL PPDU. Through this, the transmission probability of the trigger information may be increased.

The second wireless communication terminal acquires the trigger information based on the MAC header of the MPDU included in the DL PPDU. Specifically, the second wireless communication terminal may acquire the trigger information from the MAC header of the MPDU included in the DL PPDU. In a specific embodiment, the second wireless communication terminal may obtain RU allocation information from the MAC header of the MPDU included in the DL PPDU. The second wireless communication terminal may transmit ACK information indicating whether the MPDU included in the DL PPDU is received to the first wireless communication terminal based on the RU allocation information. At this time, the ACK information may be Block ACK information.

The second wireless communication terminal may obtain the UL PPDU length information from the MAC header of the MPDU included in the DL PPDU. Also, the second wireless communication terminal may transmit ACK information and data together as described above. At this time, the second wireless communication terminal may transmit ACK information indicating whether the data and the MPDU included in the DL PPDU are received based on the UL PPDU length information. Specifically, the second wireless communication terminal may transmit data based on the remaining length excluding the length required for transmitting the ACK information indicating whether the MPDU included in the DL PPDU is received from the length indicated by the UL PPDU length information. For example, the second wireless communication terminal may transmit data having a length less than the remaining length excluding the length required for transmitting ACK information indicating whether the MPDU included in the DL PPDU is received from the length indicated by the UL PPDU length information.

Figure 13:
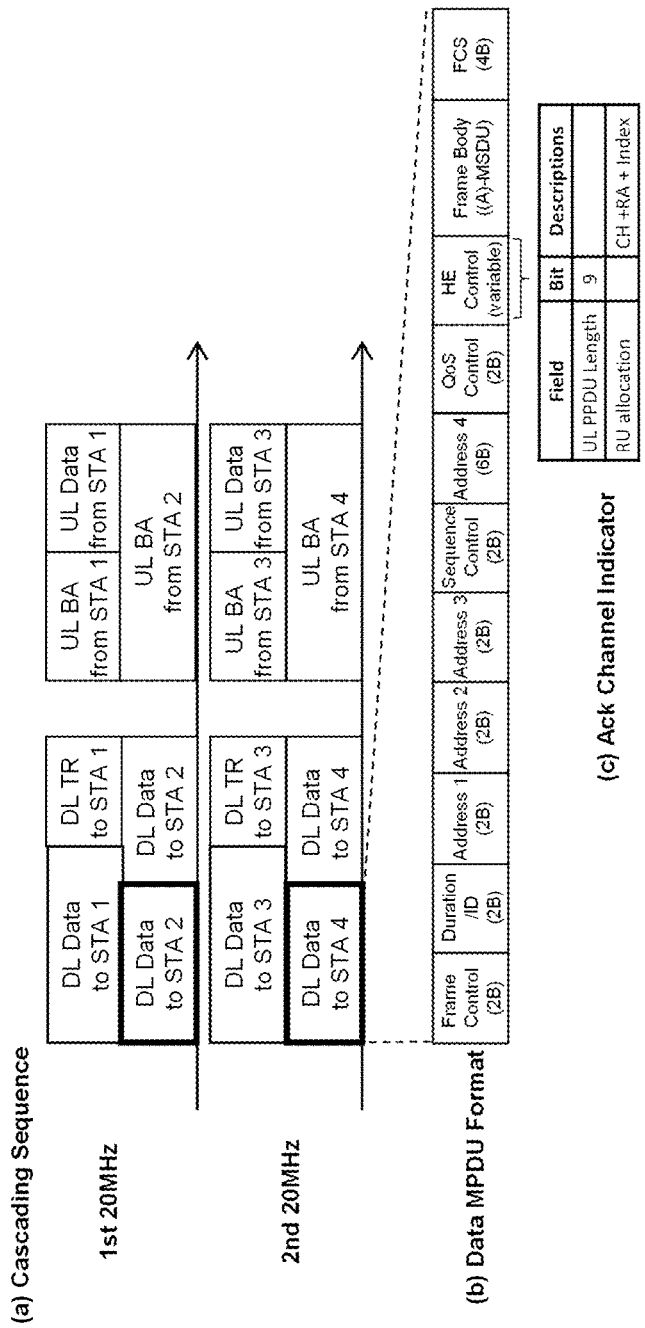
FIG. 13 shows another configuration of an MCA header when a wireless communication terminal according to an embodiment of the present invention transmits control information through a MAC header.

FIG. 13 shows another configuration of an MCA header when a wireless communication terminal according to an embodiment of the present invention transmits control information through a MAC header.

As described above, the first wireless communication terminal may transmit the trigger information to the plurality of second wireless communication terminals through the MAC header of the MPDU included in the DL MU PPDU. At this time, the plurality of second wireless communication terminals may transmit the UL MU PPDU including the ACK information indicating whether the DL MU PPDU is received based on the trigger information. In a specific embodiment, in relation to the first wireless communication terminal, the DL MU PPDU may transmit trigger information through a trigger MPDU separate from the MAC header of the MPDU, as in the embodiment of FIG. 13(a).

The concrete format of the MAC header of the MPDU included in the DL MU PPDU may be the same as the embodiment of FIG. 13(b). The MAC header of the MPDU includes an HE Control field. The HE Control field is a field whose concrete format varies depending on the type of Control information included in the MAC header. At this time, the HE Control field of the MAC header may include trigger information.

The specific format of the trigger information may be the same as the embodiment of FIG. 13(c). The trigger information may include the RU allocation information and UL PPDU length information described above. In relation to the second wireless communication terminal, the information not included in the trigger information included in the MAC header may transmit the UL PPDU by referring to the trigger information of the trigger frame. In a specific embodiment, the size of the field indicating the UL PPDU length information included in the trigger information included in the MAC header may be smaller than the size of the field indicating the UL PPDU length information in the trigger frame. Specifically, the field indicating the UL PPDU length information included in the trigger information included in the MAC header is a 9-bit field, and the field indicating the UL PPDU length information in the trigger frame may be a 12-bit field. This is because the length of the UL PPDU according to the trigger information included in the MAC header may be shorter than the length of the UL PPDU according to the trigger frame.

At this time, the second wireless communication terminal may set the value of the L_LENGTH field of the L-SIG included in the UL PPDU by referring to the value of the UL PPDU length information.

The RU allocation information includes information on a channel, which is a frequency band having a bandwidth of 20 MHz allocated by the second wireless communication terminal, information on the type of RU included in the channel, and information indicating how many frequency bands are allocated to the second wireless communication terminal. At this time, if the second wireless communication terminal is designated to transmit the UL PPDU only through the channel on which the data is received, the information on the channel may be omitted.

The specific format of the RU allocation information included in the trigger information included in the MAC header may be the same as the format of the RU allocation information included in the trigger frame. The format of the RU allocation information included in the trigger frame will be described in detail with reference to the structure of the trigger frame in FIG. 14.

Figure 14:
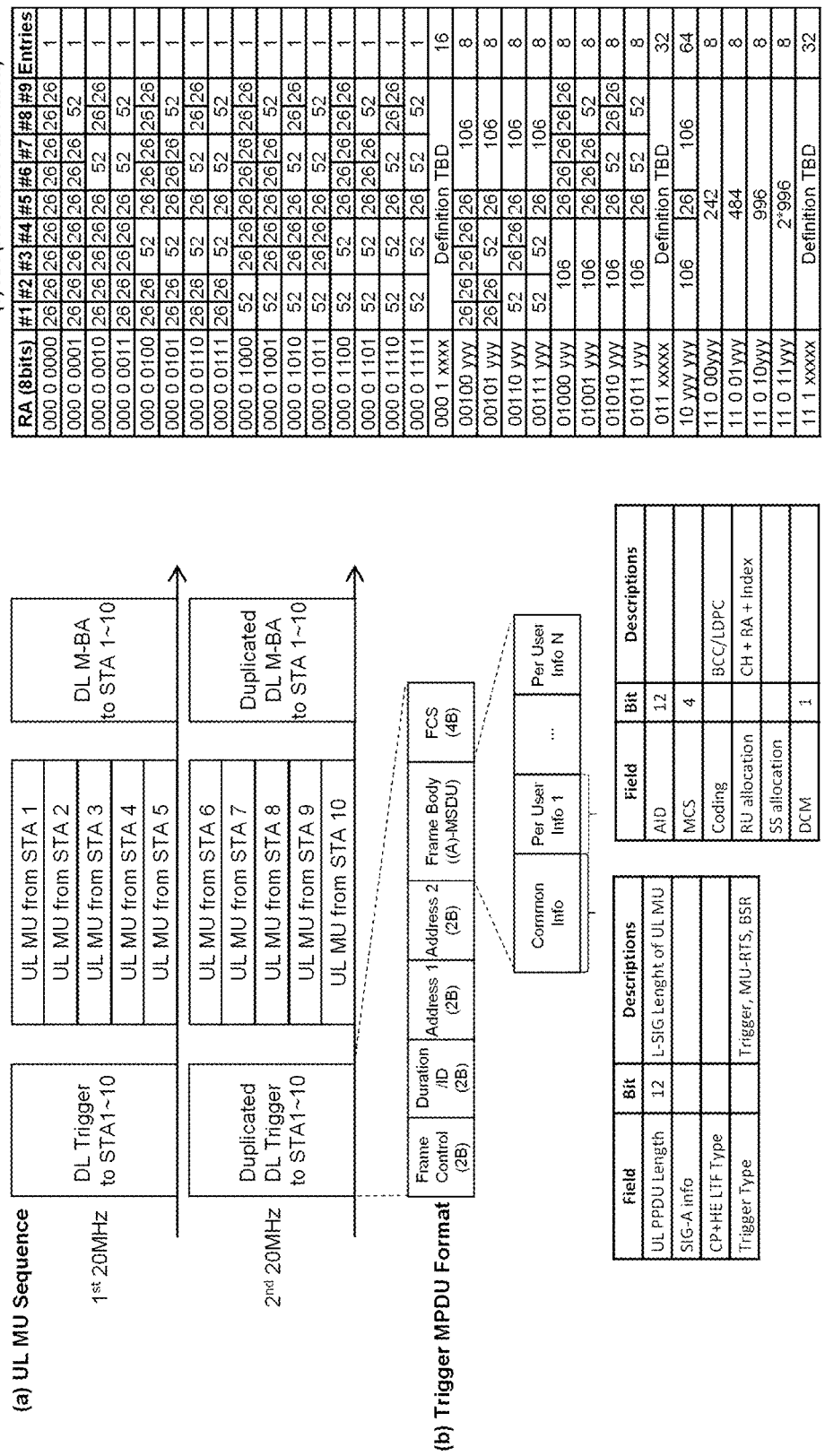
FIG. 14 shows a specific format of a trigger frame according to an embodiment of the present invention.

FIG. 14 shows a concrete format of a trigger MPDU according to an embodiment of the present invention.

The first wireless communication terminal may trigger the data transmission of the plurality of second wireless communication terminals by transmitting the trigger frame to the plurality of second wireless communication terminals. At this time, the first wireless communication terminal may transmit the same trigger frame for each 20 MHz frequency band.

In the embodiment of FIG. 14(a), the access point transmits a trigger frame to the first station STA1 to the tenth station STA10. At this time, the access point transmits the same trigger frame every 20 MHz bandwidth. In another specific embodiment, the access point may transmit the trigger frame through the entire 40 MHz frequency band.

The first to tenth stations STA1 to STA10 transmit data to the access point based on the trigger frame.

The trigger frame includes a Frame Control field, a Duration/ID field, an Address1 field, an Address2 field, a Frame Body field, and an FCS field.

At this time, the Frame Body field includes a Common Info field indicating information commonly applied to the second wireless communication terminal receiving the trigger frame, and a Per User Info field indicating information applied to the second wireless communication terminal.

The Common Info field includes a UL PPDU Length field, a SIG-A Info field, a CP+HE LTF Type field, and a Trigger Type field.

The UL PPDU Length field indicates the length of the UL PPDU transmitted from the second wireless communication terminal. The second wireless communication terminal may set the value of the L_LENGTH field of the L-SIG included in the UL PPDU to the value of the UL PPDU length information.

The SIG-A Info field indicates information to be included in the SIG-A when the second wireless communication terminal transmits the UL PPDU. Specifically, the SIG-A Info field may indicate at least one of a frequency bandwidth, a BSS color, and a TXOP duration of an UL PPDU to be included in the SIG-A when the second wireless communication terminal transmits the UL PPDU. At this time, the TXOP indicates a time duration during which the wireless communication terminal may perform transmission without additional contention procedure.

The CP+HE LTF Type field indicates a Cyclic Prefix (CP) length and a type of LTF to be applied when the second wireless communication terminal transmits the UL PPDU.

The Trigger Type field indicates the transmission type of the UL PPDU triggered by the trigger frame. Specifically, the transmission type of UL PPDU indicated by the Trigger Type field may indicate at least one of data transmission, simultaneous CTS transmission, and buffer status report (BSR) transmission.

The Per User Info field includes an AID field, an MCS field, a Coding field, an RU allocation field, an SS allocation field, and a DCM field.

The AID field indicates a second wireless communication terminal corresponding to Per User Info.

The MCS field indicates an MCS to be used by the second wireless communication terminal when transmitting the UL PPDU.

The Coding field indicates a coding type to be used when the second wireless communication terminal transmits the UL PPDU. The coding type may indicate at least one of BCC and LDPC.

The RU allocation field is RU allocation information indicating an RU allocated to the second wireless communication terminal by the first wireless communication terminal. Specifically, the RU allocation field includes information CH on a channel, which is a frequency band having a bandwidth of 20 MHz, information RA on the type of RU included in the channel, and information STA index indicating how many frequency bands are allocated to the second wireless communication terminal.

For example, it is assumed that the value of the RU allocation field corresponding to the tenth station STA10 in the embodiment of FIG. 14(*a*) is 2nd 20 MHz, 00001111, and 5. At this time, the channel allocated to the tenth station STA10 is the second 20 MHz band. Also, the channel allocated to the tenth station STA10 is divided into RUs composed of 52/52/26/52/52 subcarriers. Also, the tenth station STA10 indicates that the last 52 RUs, which is the fifth of the corresponding channel, is allocated.

The SS allocation field indicates the number of spatial streams to be transmitted in the allocated RU when the second wireless communication terminal transmits the UL PPDU.

The DCM field indicates whether or not the second wireless communication terminal applies Dual Carrier Modulation (DCM) when transmitting the UL PPDU.

When the first wireless communication terminal transmits the trigger information through the MAC header of the MPDU included in the DL MU PPDU, the transmission probability of the trigger information may be increased. At this time, the first wireless communication terminal may transmit the trigger information through the trigger MPDU in addition to the MAC header of the MPDU included in the DL MU PPDU. Through this, the first wireless communication terminal may further increase the transmission probability of the trigger information. This will be described with reference to FIG. 15.

Figure 15:
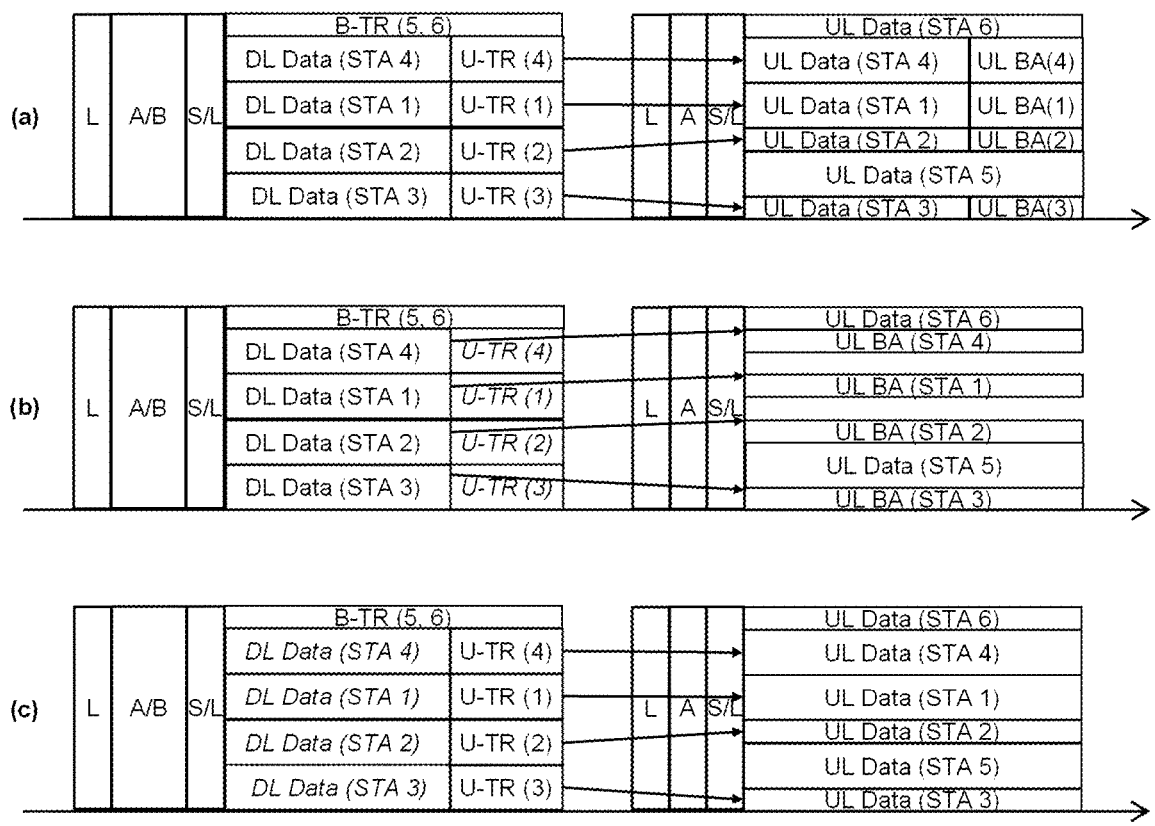
FIG. 15 shows that the wireless communication terminal according to the embodiment of the present invention transmits trigger information through the MAC header of the MPDU included in the DL MU PPDU and the trigger MPDU.

FIG. 15 shows that the wireless communication terminal according to the embodiment of the present invention transmits trigger information through the MAC header of the MPDU included in the DL MU PPDU and the trigger MPDU.

In the embodiment of FIG. 15(*a*), the access point AP transmits the A-MPDU including the data and the unicast trigger MPDU to the first station STA1 to the third station STA3. In addition, the access point transmits a broadcast trigger MPDU to the fifth and sixth stations STA5 and STA6. At this time, the first to fourth stations STA1 to STA4 transmit data and a BA MPDU to the access point based on the unicast trigger MPDU. In addition, the fifth to sixth stations STA5 to STA6 transmit data to the access point based on the broadcast trigger MPDU.

At this time, if at least one of the first to fourth stations STA1 to STA4 fails to receive the unicast trigger MPDU, some frequency bands are wasted. However, it is possible to prevent the access point from transmitting the trigger information through the MAC header of the MPDU included in the DL MU PPDU.

For example, in the embodiment of FIG. 15(*b*), the access point also transmits trigger information through the MAC header of the MPDU included in the DL MU PPDU. At this time, even if the first to fourth stations STA1 to STA4 fail to receive the unicast trigger MPDU, the first to fourth stations STA1 to STA4 may transmit data and a BA MPDU to the access point based on the MAC header of the MPDU included in the DL MU PPDU.

In addition, as in the embodiment of FIG. 15(*c*), even if the first to fourth stations STA1 to STA4 fail to receive the data MPDU, the first to fourth stations STA1 to STA4 may transmit data to the access point based on the unicast trigger MPDU.

At this time, the trigger information included in the trigger MPDU and the trigger information included in the MAC header of the MPDU included in the DL MU PPDU may be the same. If the contents of the trigger information included in the trigger MPDU and the trigger information included in the MAC header of the MPDU included in the DL MU PPDU are not the same, the second wireless communication terminal may give priority to the late received information. In addition, the second wireless communication terminal may operate according to the information included in the trigger MPDU with respect to the trigger information not included in the MAC header of the MPDU included in the DL MU PPDU.

When the second wireless communication terminal transmits the ACK information to the first wireless communication terminal according to a predetermined rule, the first wireless communication terminal may not explicitly transmit the trigger information. This reduces the overhead required to transmit trigger information. This will be described with reference to FIG. 16.

Figure 16:
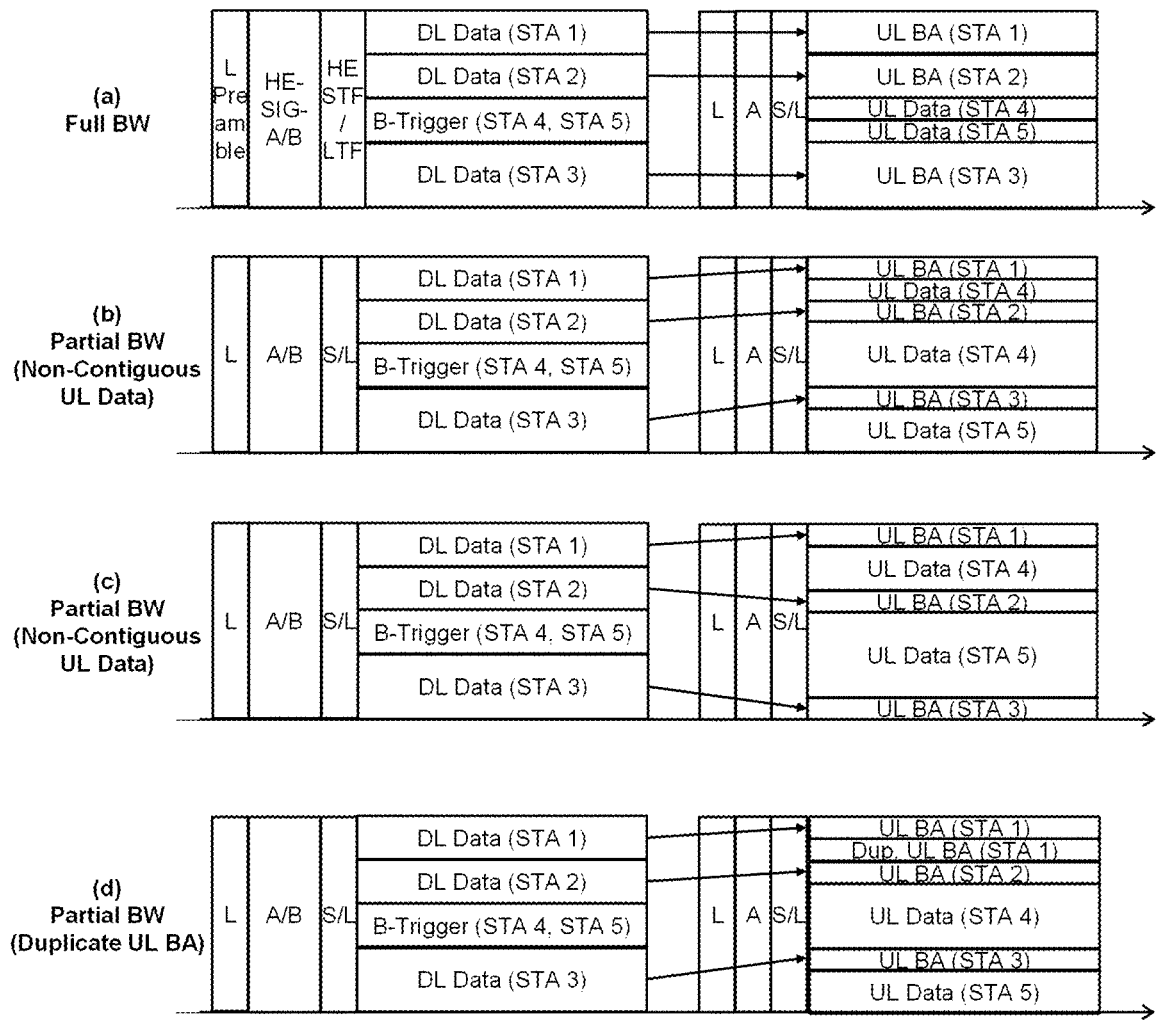
FIG. 16 illustrates a method of implicitly transmitting trigger information according to an embodiment of the present invention.

FIG. 16 illustrates a method of implicitly transmitting trigger information according to an embodiment of the present invention.

The second wireless communication terminal may transmit ACK information on the MPDU included in the DL PPDU to the first wireless communication terminal through the frequency band on which the DL PPDU is received. For example, in the embodiment of FIG. 16(a), each of the first station STA1 to the third station STA3 transmits a BA MPDU for received data to the access point through a frequency band on which data is received from the access point. Through this, the second wireless communication terminal may transmit ACK information on the MPDU included in the DL PPDU transmitted from the first wireless communication terminal to the first wireless communication terminal without receiving the separate trigger information. If a wide frequency band is allocated to the second wireless communication terminal during DL PPDU transmission, the second wireless communication terminal transmits ACK information through a wide frequency band. Therefore, a frequency band may be wasted.

The second wireless communication terminal may transmit ACK information on the MPDU included in the DL PPDU to the first wireless communication terminal through a part of the frequency band on which the DL PPDU is received. Specifically, the second wireless communication terminal may transmit ACK information on the MPDU included in the UL PPDU using a frequency band of a predetermined bandwidth among the frequency bands in which the DL PPDU is received. For example, in the embodiments of FIGS. 16(b) and 16(c), the third station STA3 transmits BA MPDUs for data using only a part of the frequency bands in which data is received. At this time, some of the frequency bands used by the second wireless communication terminal may be the lowest frequency band among the frequency bands in which the DL PPDU is received. In another specific embodiment, some of the frequency bands used by the second wireless communication terminal may be the highest frequency band among the frequency bands in which the DL PPDU is received. In another specific embodiment, some of the frequency bands used by the second wireless communication terminal may be a predetermined position in the frequency band in which the DL PPDU is received.

The second wireless communication terminal other than the second wireless communication terminal that transmits ACK information may transmit data through a frequency band other than the frequency band used for ACK information transmission. At this time, the second wireless communication terminal other than the second wireless communication terminal that transmits the ACK information may transmit data through the discontinuous frequency band like the fourth station STA4 in the embodiment of FIG. 16(b). In another specific embodiment, the second wireless communication terminal other than the second wireless communication terminal transmitting the ACK information may transmit data through a continuous frequency band like the fourth station STA4 in the embodiment of FIG. 16(c). At this time, in order for the second wireless communication terminal other than the second wireless communication terminal transmitting the ACK information to transmit data through the continuous frequency band, the first wireless communication terminal may allocate a certain frequency band to the second wireless communication terminal that transmits the ACK information. Through such an operation, it is possible to reduce waste of the frequency band when transmitting the ACK information of the second wireless communication terminal.

Also, through some of the frequency bands in which the DL PPDU is received, the second wireless communication terminal may repeatedly transmit the ACK information on the MPDU included in the DL PPDU in the frequency domain to the first wireless communication terminal. Specifically, through the unassigned frequency band for data transmission among the frequency bands in which the DL PPDU is received, the second wireless communication terminal may repeatedly transmit the ACK information on the MPDU included in the DL PPDU in the frequency domain to the first wireless communication terminal. For example, in the embodiment of FIG. 16(d), the first station STA1 repeatedly transmits BA in a frequency band not allocated to another station among the frequency bands in which data is received. Through such an operation, the second wireless communication terminal may increase the transmission probability of the ACK information.

Referring to FIGS. 6 to 16, an embodiment of a method of transmitting control information has been described. A transmission failure may occur even if the transmission probability of the control information is increased. Therefore, if transmission of control information fails, a method for recovering it is needed. This will be described with reference to FIGS. 17 to 19.

Figure 17:
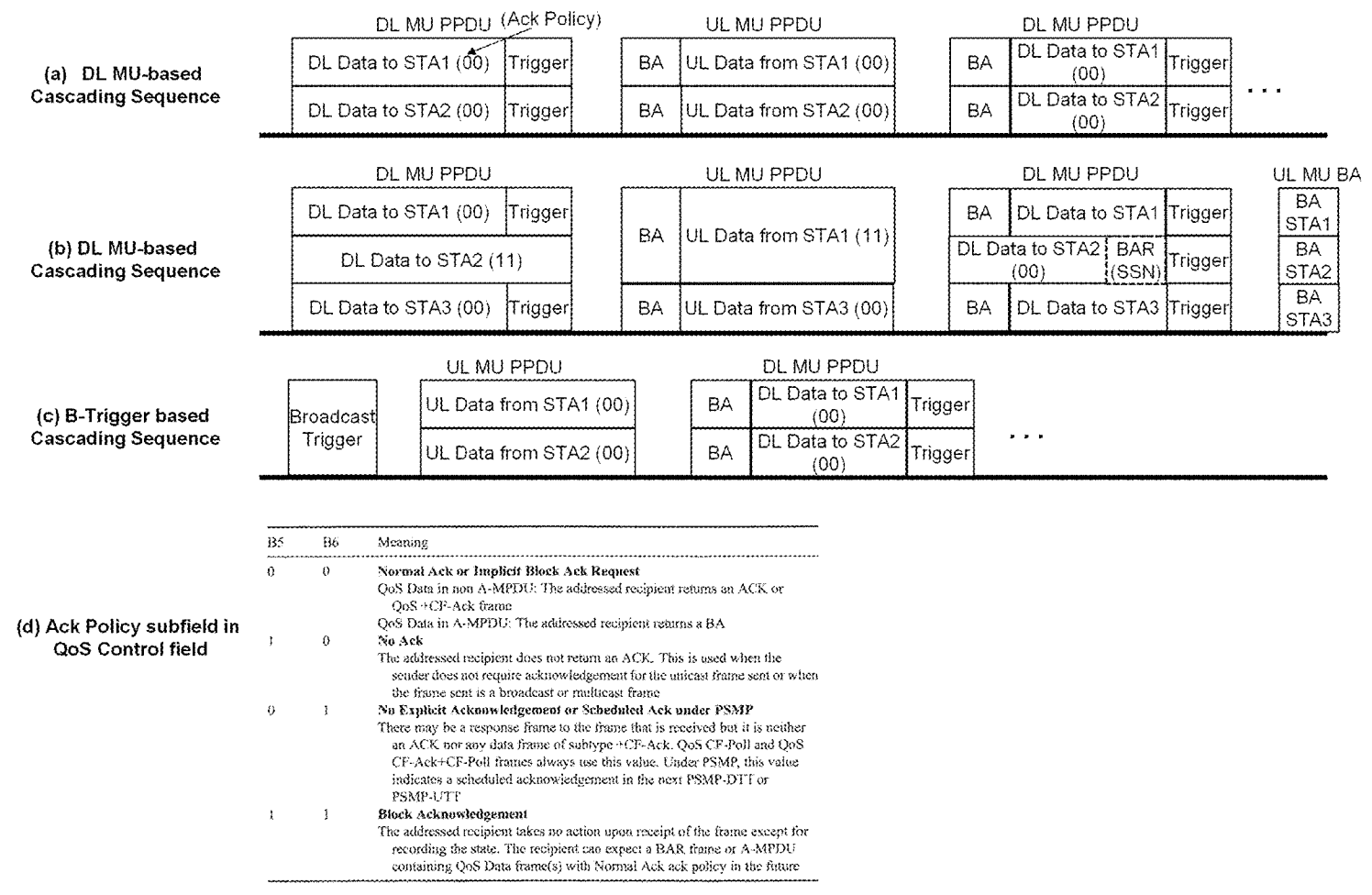

FIG. 17 shows a method of setting an ACK policy when a wireless communication terminal transmits data through a cascading sequence according to an embodiment of the present invention.

The first wireless communication terminal and the second wireless communication terminal may transmit data and receive data in one TXOP. That is, DL MU PPDU transmission and UL MU PPDU transmission may be performed in one TXOP. At this time, the first wireless communication terminal may transmit the trigger information to the second wireless communication terminal. The second wireless communication terminal may transmit data to the first wireless communication terminal based on the trigger information. The case that the first wireless communication terminal and the second wireless communication terminal transmit data and receive data in one TXOP is referred to as a cascading sequence.

In addition, the wireless communication terminal may designate a method of a wireless communication terminal receiving data to transmit ACK indicating whether or not the data is received, at the time of data transmission. An ACK transmission method indicating whether data is received is referred to as an ACK policy. The wireless communication terminal receiving the data transmits the ACK information to the wireless communication terminal transmitting the data according to the ACK policy. In a specific embodiment, when the QoS Data MPDU is transmitted, the ACK policy may be included in the subfield in the QoS Control field in the MAC Header.

The ACK policy may be classified as in the embodiment of FIG. 17(d). Specifically, the ACK policy may indicate that the wireless communication terminal receiving the data transmits ACK information immediately after data reception. At this time, "immediately" may indicate that ACK information is transmitted without transmitting other information. In addition, when the wireless communication terminal that transmits the data fails to receive the ACK information from the wireless communication terminal that receives the data, the wireless communication terminal may transmit a Block Ack Request (BAR) MPDU to the wireless communication terminal that receives the data. In another exemplary embodiment, when the wireless communication terminal that transmits the data fails to receive the ACK information from the wireless communication terminal that receives the data, the wireless communication terminal may transmit data different from the previously transmitted data to the wireless communication terminal that receives the data. Accordingly, the wireless communication terminal that transmits the data may determine whether or not the wireless communication terminal that receives the data receives the data. In a specific embodiment, if the ACK policy indicates that the wireless communication terminal that receives the data is to transmit ACK information immediately after data reception, the value of the field indicating the ACK policy may be 00.

In the embodiment of FIG. 17(a), while transmitting data to the first station STA1 and the second station STA2, the access point AP sets the ACK policy to transmit the ACK information immediately after the wireless communication terminal receiving the data receives data. At this time, the access point AP transmits a DL MU PPDU including the trigger MPDU and the data MPDU to the first station STA1 and the second station STA2.

The first station STA1 and the second station STA2 receive the data and immediately transmit the BA MPDU for the received data to the access point AP. At this time, the first station STA1 and the second station STA2 transmit the UL MU PPDU including the BA MPDU and the data MPDU together. At this time, the ACK policy indicates that the wireless communication terminal that receives the data transmits the ACK information immediately after the data reception.

The access point AP receives data from the first station STA1 and the second station STA2. The access point AP immediately transmits the BA MPDU for the received data to the first station STA1 and the second station STA2. At this time, the access point AP transmits the DL MU PPDU including the BA MPDU and the data MPDU together.

In addition, the ACK policy may indicate that the wireless communication terminal receiving the data does not need to transmit the ACK information. At this time, the wireless communication terminal receiving the data receives the data and does not transmit the ACK information. In a specific embodiment, if the ACK policy indicates that the wireless communication terminal receiving the data does not need to transmit the ACK information, the value of the field representing the ACK policy may be binary 10.

In addition, the ACK policy may indicate that the wireless communication terminal receiving the data does not transmit the ACK or transmits the ACK in the PSMP section. In a specific embodiment, if the ACK policy indicates that the wireless communication terminal receiving the data does not transmit the ACK or transmit the ACK in the PSMP section, the value of the field indicating the ACK policy may be binary 01.

In addition, the ACK policy may indicate that the wireless communication terminal receiving the data transmits BA information when receiving a separate BAR frame. At this time, the wireless communication terminal receiving the data may store the reception status for each MPDU, and may transmit the BA information when receiving the BAR frame. The wireless communication terminal may transmit a PPDU including a BAR MPDU and a trigger MPDU together. At this time, the wireless communication terminal may transmit the BAR MPDU before transmitting the trigger MPDU. Specifically, the wireless communication terminal may transmit the trigger MPDU to the last MPDU included in the PPDU. The BAR MPDU is a response request at the MAC layer, and the trigger MPDU is an MPDU requesting a response at the physical layer. Therefore, in order to start data generation preparation first at the MAC layer, the wireless communication terminal receiving the data may transmit the BAR MPDU before the trigger MPDU. Also, the wireless communication terminal may transmit the BA MPDU before data MPDU transmission. As described above, the wireless communication terminal may transmit the BA MPDU to the first MPDU included in the PPDU.

In a specific embodiment, when the ACK policy indicates that the wireless communication terminal receiving the data transmits the BA information in the case of receiving a separate BAR frame, the value of the field indicating the ACK policy may be binary 11.

In the embodiment of FIG. 17(b), the access point AP sets the ACK policy to transmit the BA information when the wireless communication terminal receiving the data receives the separate BAR frame while transmitting data to the second station STA2. In addition, while transmitting data to the first station STA1 and the third station STA3, the access point AP sets the ACK policy to transmit the ACK information immediately after the wireless communication terminal receiving the data receives data. At this time, the access point AP transmits a DL MU PPDU including the trigger MPDU and the data MPDU to the first station STA1 and the third station STA3.

The first station STA1 and the third station STA3 receive the data and immediately transmit the BA MPDU for the received data to the access point AP. At this time, the first station STA1 and the third station STA3 transmit the UL MU PPDU including the BA MPDU and the data MPDU together. At this time, the ACK policy indicates that the wireless communication terminal that receives the data transmits the ACK information immediately after the data reception.

The access point AP receives data from the first station STA1 and the third station STA3. The access point AP immediately transmits the BA for the received data to the first station STA1 and the third station STA3. At this time, the access point AP transmits the DL MU PPDU including the BA MPDU and the data MPDU together. In addition, the access point AP may transmit the BAR MPDU and the trigger MPDU while transmitting data to the second station SAT2. At this time, the BAR MPDU includes a Starting Sequence Number (SSN). Specifically, the SSN instructs to transmit whether or not to receive the MPDU corresponding to the sequence number after the sequence number indicated by the SSN. The access point AP first transmits the BAR MPDU to the second station SAT2 rather than the trigger MPDU.

The first to third stations STA1 to STA3 transmit the BA MPDU to the access point AP. At this time, the second station STA2 transmits a BA MPDU indicating whether to receive the MPDU corresponding to the sequence number after the sequence number indicated by the SSN.

Unlike the above-described embodiments, the first wireless communication terminal may transmit the trigger MPDU to start the cascading transmission. At this time, the first wireless communication terminal may set the TXOP of the cascading sequence based on the traffic priority of the UL MU PPDU to be transmitted first. In the embodiment of FIG. 17(c), the access point AP transmits a broadcast trigger MPDU to the first station STA1 and the second station STA2. The access point AP sets the TXOP of the cascading sequence based on the traffic priority of the UL MU PPDU to be transmitted from the first station STA1 and the second station STA2.

The first station STA1 and the second station STA2 transmit data to the access point AP based on the broadcast trigger MPDU. At this time, the ACK policy indicates that the wireless communication terminal that receives the data transmits the ACK information immediately after the data reception.

The access point AP receives data from the first station STA1 and the second station STA2. The access point AP immediately transmits an ACK MPDU to the first station STA1 and the second station STA2. At this time, the access point AP transmits the PPDU including the BA MPDU, the data MPDU, and the trigger MPDU.

Figure 18:
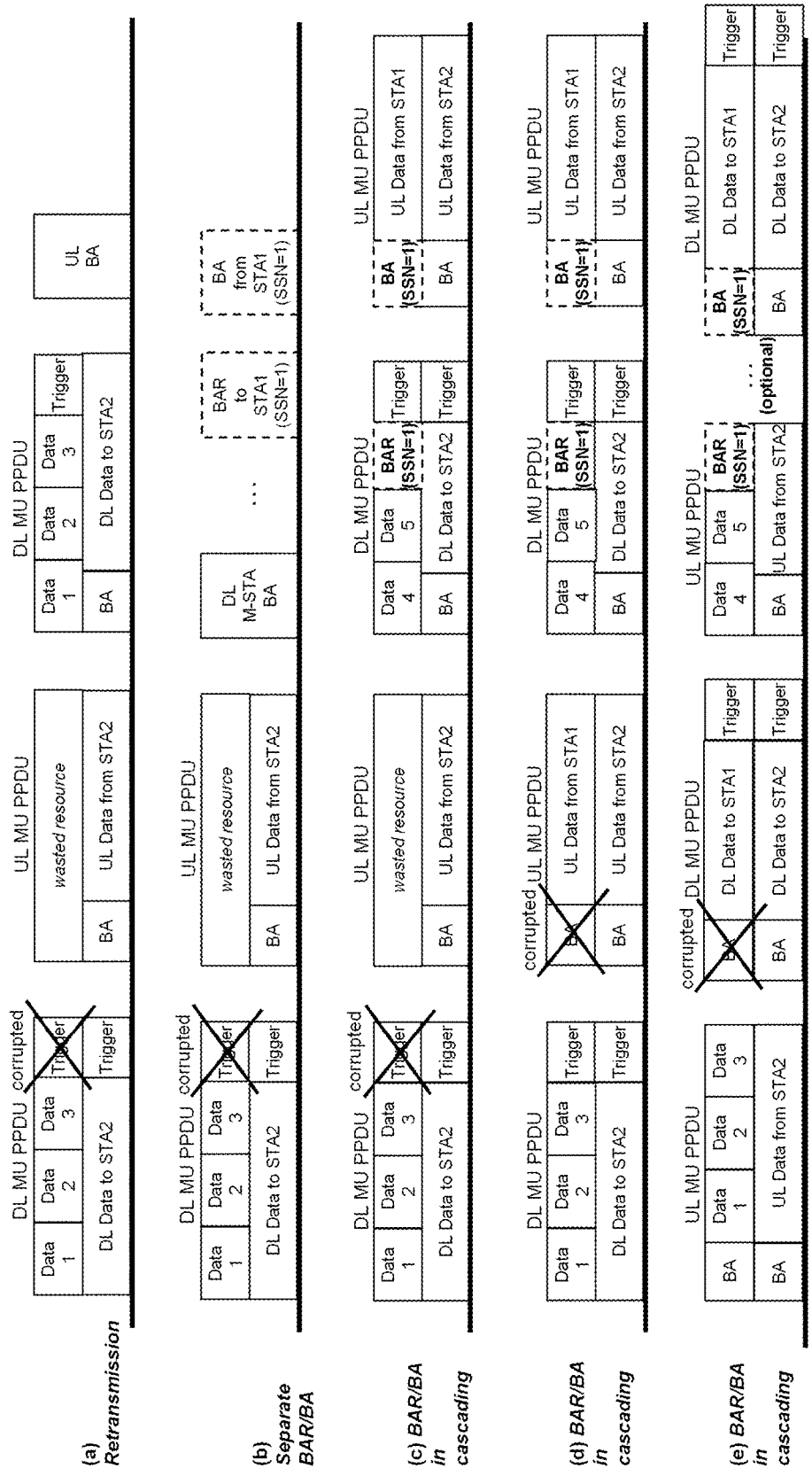
FIG. 18 illustrates a method for a wireless communication terminal to recover a cascading sequence when ACK information is not received in the cascading sequence according to an embodiment of the present invention.

FIG. 18 illustrates a method for a wireless communication terminal to recover a cascading sequence when ACK information is not received in the cascading sequence according to an embodiment of the present invention.

The wireless communication terminal that does not receive the ACK information in the cascading sequence may transmit the PPDU including the data again. In the embodiment of FIG. 18(a), the access point AP transmits a PPDU including a plurality of data MPDUs data 1, data 2, and data 3 and a trigger MPDU to the first station SAT1. At this time, the first station STA1 fails to receive the trigger MPDU. Therefore, the first station STA1 may not use the uplink transmission opportunity allocated to the first station STA1. Accordingly, the access point AP again transmits a plurality of data MPDUs data 1, data 2, and data 3 and a PPDU including a trigger MPDU. When the PPDU including the data is retransmitted as described above, it may occur that the first station STA1 transmits the normally received data again as in the embodiment of FIG. 18(a).

In another specific embodiment, a wireless communication terminal that fails to receive ACK information in a cascading sequence may transmit a BAR frame after a cascading sequence. In the embodiment of FIG. 18(b), the access point AP transmits a PPDU including a plurality of data MPDUs data 1, data 2, and data 3 and a trigger MPDU to the first station SAT1. At this time, the first station STA1 fails to receive the trigger MPDU. Therefore, the first station STA1 may not use the transmission opportunity allocated to the first station STA1. Accordingly, after the cascading sequence ends, the access point AP transmits a BAR frame to the first station STA1. Through this, the access point AP receives the BA frame and determines whether or not the first station STA1 receives the plurality of data MPDUs data 1, data 2, and data 3 through the BA information. Also, the access point AP sets the SSN of the BAR frame to 1, which is the start sequence number of the data MPDU that does not receive the BA MPDU. When the first wireless communication terminal transmits a BAR MPDU after a cascading sequence, a separate SU PPDU type BAR frame and BA frame transmission is required. Therefore, when the first wireless communication terminal transmits the BAR frame after the cascading sequence, resource waste may occur compared to a case where the first wireless communication terminal transmits the BAR MPDU through the MU PPDU.

In another specific embodiment, a wireless communication terminal that fails to receive ACK information in a cascading sequence may transmit a BAR MPDU in a cascading sequence. In the embodiment of FIG. 18(c), the access point AP transmits a PPDU including a plurality of data MPDUs data 1, data 2, and data 3 and a trigger MPDU to the first station SAT1. At this time, the first station STA1 fails to receive the trigger MPDU. Therefore, the first station STA1 may not use the uplink transmission opportunity allocated to the first station STA1. At this time, the access point AP transmits the BAR MPDU to the first station STA1 in the corresponding cascading sequence. At this time, the access point AP may transmit the PPDU including the BAR MPDU and the data MPDU together as in the embodiment of FIG. 18(c). Through this, waste of transmission resources may be prevented. Further, the access point AP sets the SSN of the BAR MPDU to 1, which is the start sequence number of the data MPDU that does not receive the BA MPDU.

In the embodiment of FIG. 18(d), the access point AP fails to receive the BA MPDU transmitted from the first station STA1. The access point AP transmits the BAR MPDU to the first station STA1 in the cascading sequence as described with reference to FIG. 18(c).

In the case where the BA is not received from the counterpart wireless communication terminal, not only the first wireless communication terminal but also the second wireless communication terminal may transmit the BAR MPDU in the cascading sequence. In the embodiment of FIG. 18(e), the first station STA1 transmits a PPDU including a plurality of data MPDUs data 1, data 2, and data 3 to the access point AP. The access point AP transmits a BA MPDU for a plurality of data MPDUs data 1, data 2, and data 3 to the first station STA1. At this time, the first station STA1 fails to receive the BA MPDU for the plurality of data MPDUs data 1, data 2, and data 3. Accordingly, the first station STA1 transmits the BAR MPDU to the AP in the corresponding cascading sequence. At this time, the first station STA1 may transmit the PPDU including the BAR MPDU and the data MPDU together as in the embodiment of FIG. 18(e). In addition, the first station STA1 may set the SSN of the BAR MPDU to 1. If there is no data to be transmitted from the access point AP to the first station STA1, the access point AP may delay transmission of the BA MPDU to the first station STA1. In this case, the access point AP may, in principle, transmit the BA MPDU within the corresponding TXOP.

In the case of restoring the cascading sequence through the embodiments described with reference to FIGS. 18(c) to 18(e), the wireless communication terminal must transmit a separate BAR MPDU. Therefore, radio resources for transmitting the BAR MPDU are consumed. The wireless communication terminal may request transmission of the ACK information for the MPDU previously transmitted through the MAC header of the data MPDU. In this case, the wireless communication terminal may not consume radio resources to transmit the BAR MPDU. This will be described with reference to FIG. 19.

Figure 19:
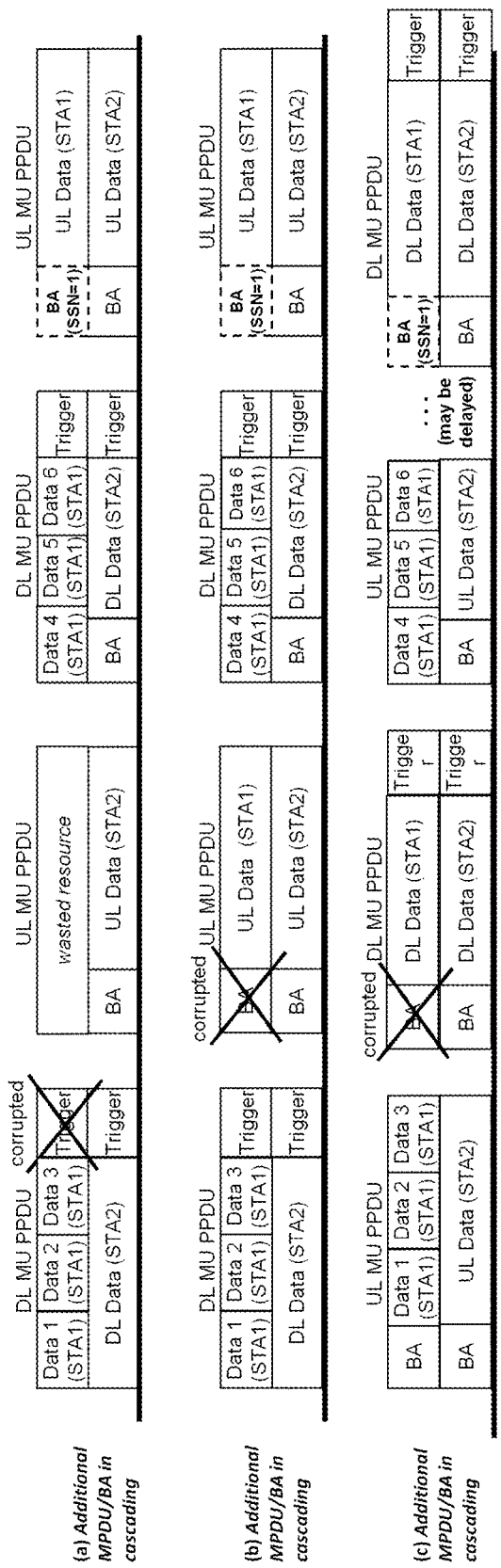
FIG. 19 shows that a wireless communication terminal according to an embodiment of the present invention requests transmission of ACK information for an MPDU previously transmitted through a MAC header of a data MPDU.

FIG. 19 shows that a wireless communication terminal according to an embodiment of the present invention requests transmission of ACK information for an MPDU previously transmitted through a MAC header of a data MPDU.

The wireless communication terminal may request transmission of the ACK information for the MPDU previously transmitted through the MAC header of the data MPDU. Specifically, the wireless communication terminal sets the ACK policy of the data MPDU to transmit ACK information immediately after data reception, so that the wireless communication terminal may request to transmit a BA MPDU indicating whether it receives a previously received MPDU in the corresponding cascading sequence.

In the embodiment of FIG. 19(a), the access point AP transmits a PPDU including a plurality of data MPDUs data 1, data 2, and data 3 and a trigger MPDU to the first station SAT1. At this time, the first station STA1 fails to receive the trigger MPDU. Therefore, the first station STA1 may not use the uplink transmission opportunity allocated to the first station STA1. Then, the access point AP requests transmission of the BA frame for the previously transmitted data MPDU data 1, data 2, and data 3 through the ACK policy of the data MPDU data 4, data 5, and data 6 transmitted to the first station STA1 in the cascading sequence. At this time, the ACK policy may indicate to transmit ACK information immediately after data reception. In a specific embodiment, the value of the field representing the ACK policy may be 0. The first station STA1 transmits to the access point AP a BA MPDU for a plurality of data MPDUs data 1, data 2, data 3, data 4, data 5, and data 6 including the data MPDU set with the ACK policy and the data MPDU received before the data MPDU set with the ACK policy.

In the embodiment of FIG. 19(b), the access point AP fails to receive the BA MPDU transmitted from the first station STA1. Accordingly, the access point AP requests transmission of the BA information on the previous data MPDU data 1, data 2, and data 3 through the ACK policy of the data MPDUs data 4, data 5, and data 6 transmitted to the first station STA1 in the cascading sequence.

When the first wireless communication terminal don't receive the BA MPDU, the first wireless communication terminal as well as the second wireless communication terminal may request the BA information transmission by setting the ACK policy of the data frame in the cascading sequence. In the embodiment of FIG. 19(c), the first station STA1 transmits a PPDU including a plurality of data MPDUs data 1, data 2, and data 3 to the access point AP. The access point AP transmits a BA MPDU for a plurality of data MPDUs data 1, data 2, and data 3 to the first station STA1. At this time, the first station STA1 fails to receive the BA MPDU for the plurality of data MPDUs data 1, data 2, and data 3. Accordingly, the first station STA1 requests transmission of the BA information on the previously transmitted data MPDUs data 1, data 2, and data 3 through the ACK policy of the data MPDUs data 4, data 5, and data 6 transmitted to the first station STA1 in the cascading sequence. At this time, the ACK policy may indicate to transmit ACK information immediately after data reception. In a specific embodiment, the value of the field representing the ACK policy may be 0. The access point AP transmits to the first station STA1 a BA MPDU for a plurality of data MPDUs data 1, data 2, data 3, data 4, data 5, and data 6 including the data MPDU set with the ACK policy and the data MPDU received before the data MPDU set with the ACK policy. If there is no data to be transmitted from the access point AP to the first station STA1, the access point AP may delay transmission of the BA MPDU to the first station STA1. In this case, the access point AP may, in principle, transmit the BA MPDU within the corresponding TXOP.

Figure 20:
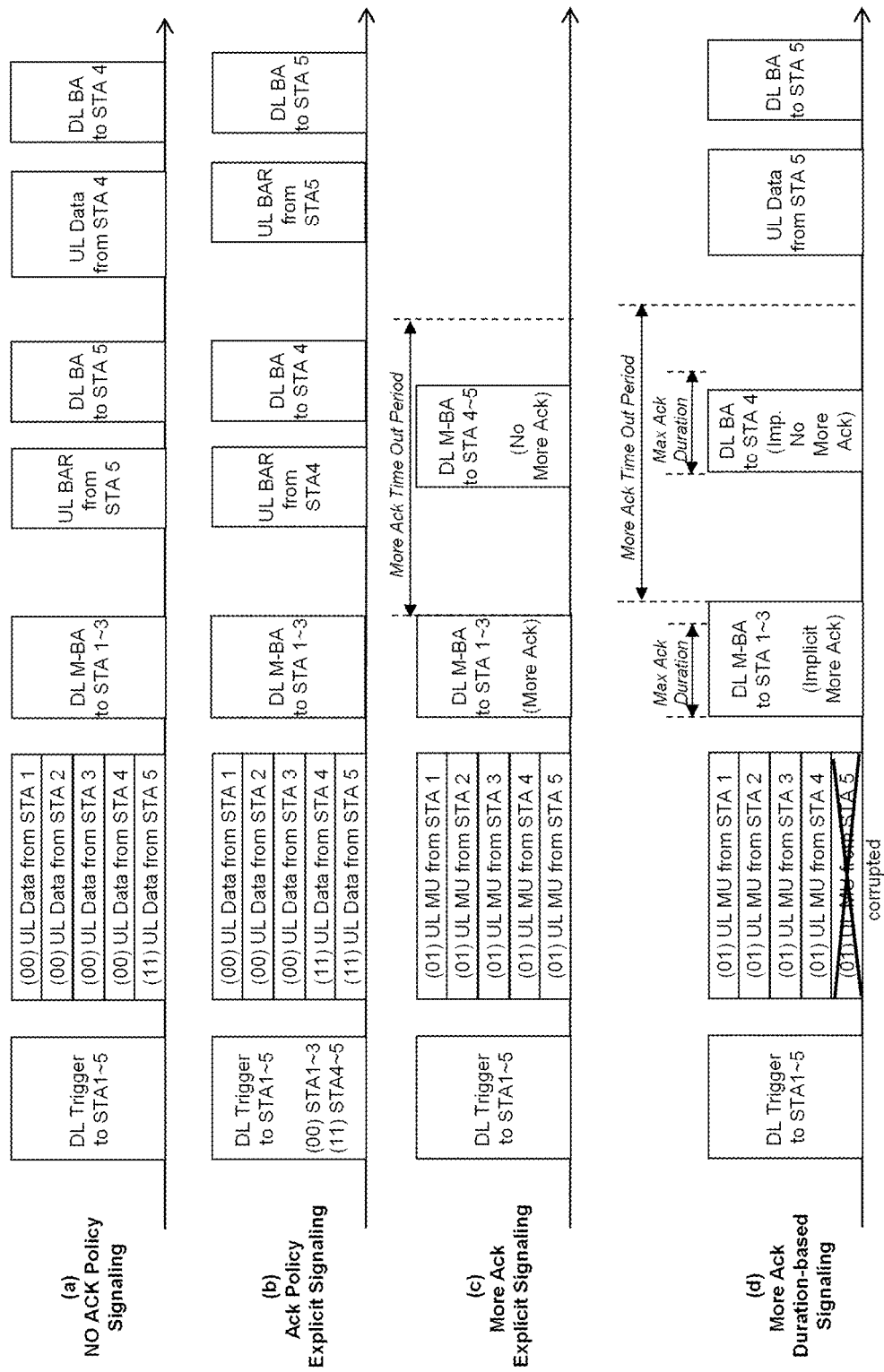
FIG. 20 shows a method of setting an ACK policy by a wireless communication terminal according to an embodiment of the present invention.

FIG. 20 shows a method of setting an ACK policy by a wireless communication terminal according to an embodiment of the present invention.

The first wireless communication terminal may not set the ACK policy of the data transmitted from the plurality of second wireless communication terminals. At this time, each of the plurality of second wireless communication terminals may arbitrarily set an ACK policy of data to be transmitted to the first wireless communication terminal. The duration of a multi-station BA (M-STA BA or M-BA) frame indicating whether data is received may be limited to a certain length or less. If the duration of the M-BA frame becomes large, it may cause collision with legacy hidden nodes. However, in such an environment, if the first wireless communication terminal does not set the ACK policy of the data transmitted from the plurality of second wireless communication terminals, the same problem as the embodiment of FIG. 20(a) may arise.

In the embodiment of FIG. 20(a), the access point AP transmits the trigger MPDU to the first station STA1 to the fifth station STA5.

The first to fifth stations STA1 to STA5 transmit data to the access point AP based on the trigger frame. At this time, the first to fourth stations STA1 to STA4 set the ACK policy of the data to be transmitted to immediately transmit the ACK information. The fifth station STA5 sets the ACK policy of the data to be transmitted to transmit the BA information when receiving a separate BAR frame.

The access point AP transmits, due to the size limitation of the M-BA frame, an M-BA frame indicating only whether the data transmitted from the first station STA1 to the third station STA3 is received and not indicating whether the data transmitted from the fourth station STA4 to the first station STA1 to the third station STA3 is received.

The fifth station STA5 transmits the BAR frame to the access point AP. At this time, the fourth station STA4 determines that the access point AP does not receive the data, and transmits the data again to the access point AP. Therefore, the fourth station STA4 repeatedly transmits data to the access point AP. Various embodiments for solving this problem will be described with reference to FIGS. 20(b) to 20(d).

The first wireless communication terminal may set the ACK policy of the data transmitted from the plurality of second wireless communication terminals through the trigger information. Specifically, the first wireless communication terminal may set the ACK policy of the data transmitted from the plurality of second wireless communication terminals through the trigger frame transmitted to the plurality of second wireless communication terminals. At this time, the second wireless communication terminal may set the ACK policy of the data to be transmitted based on the trigger frame.

For example, in the embodiment of FIG. 20(b), the access point AP transmits a trigger frame to the first station STA1 to the fifth station STA5. At this time, the access point AP sets the ACK policy of the data transmitted from the first station STA1 to the third station STA4 to immediately transmit the ACK information. In addition, the access point AP sets the ACK policy of data transmitted from the fourth station to the fifth station STA4 to STA5 to transmit a BA frame when receiving a separate BAR frame.

The first to fifth stations STA1 to STA5 transmit data to the access point AP based on the trigger frame. At this time, the first to third stations STA1 to STA3 set the ACK policy of the data to be transmitted to immediately transmit the ACK information. The fourth to fifth stations STA4 to STA5 set the ACK policy of the data to be transmitted to transmit the BA MPDU when receiving a separate BAR frame.

The access point AP transmits an M-BA MPDU indicating whether the data transmitted from the first station to the third station STA1 to STA3 is received to the first station to the third station STA1 to STA3.

The fourth station STA4 transmits the BAR frame to the access point AP. The access point AP transmits a BA frame to the fourth station STA4.

The fifth station STA5 transmits the BAR frame to the access point AP. The access point AP transmits a BA frame to the fifth station STA5.

In another specific embodiment, the first wireless communication terminal may signal whether to transmit additional ACK information when ACK information is transmitted. Accordingly, the first wireless communication terminal may solve the problem described in 20(a) without setting the ACK policy of the data transmitted from the plurality of second wireless communication terminals. When the first wireless communication terminal signals that there will be additional ACK information transmission at the time of transmitting the ACK information, the plurality of second wireless communication terminals may wait for a predetermined time without transmitting the data to the first wireless communication terminal again. If the BA frame is not received within a predetermined time, the second wireless communication terminal may transmit data again.

For example, in the embodiment of FIG. 20(c), the access point AP transmits a trigger frame to the first station STA1 to the fifth station STA5.

The first to fifth stations STA1 to STA5 transmit data to the access point AP based on the trigger frame. At this time, the first to fifth stations STA1 to STA5 set the ACK policy of the data to be transmitted to immediately transmit the ACK information.

The access point AP transmits, due to the size limitation of the M-BA frame, an M-BA frame indicating whether the data transmitted from the first station STA1 to the third station STA3 is received and not indicating the data transmitted from the fourth station STA4 to the fifth station STA5 to the first station STA1 to the third station STA3 is received. At this time, the access point AP transmits information indicating that the ACK MPDU is to be further transmitted, through the M-BA frame.

Since the access point AP transmits information indicating that the access point AP will further transmit an ACK MPDU, the fourth station STA4 to the fifth station STA5 do not transmit data again.

The access point AP transmits an M-BA frame indicating whether the data transmitted from the fourth station STA4 to the fifth station STA5 is received or not to the fourth station STA4 to the fifth station STA5.

In another specific embodiment, the first wireless communication terminal may signal whether the additional BA frame is transmitted through the duration size of the PPDU including the ACK information when the ACK information is transmitted. Specifically, when the ACK information is transmitted, the first wireless communication terminal sets a duration size of a PPDU including ACK information to a value larger than a predetermined size, thereby signaling that an additional BA frame is to be transmitted. At this time, the predetermined time may be designated by a PPDU duration required when ACK information is transmitted through a basic MCS or a value obtained by adding Distributed Inter Frame Space (DIFS) to a PPDU duration required when ACK information is transmitted through a basic MCS.

For example, in the embodiment of FIG. 20(d), the access point AP transmits a trigger frame to the first station to the fifth station STA1 to STA5.

The first to fifth stations STA1 to STA5 transmit data to the access point AP based on the trigger frame. At this time, the first to fifth stations STA1 to STA5 set the ACK policy of the data to be transmitted to immediately transmit the ACK information.

At this time, the access point AP receives the data transmitted from the first station to the fourth station STA1 to STA4 and fails to receive the data transmitted from the fifth station STA5.

The access point AP transmits an M-BA frame indicating whether the data transmitted from the first station to the third station STA1 to STA3 is received to the first station to the third station STA1 to STA3. At this time, the access point AP sets the duration size of the PPDU including the M-BA frame to a value larger than a predetermined size (Max ACK Duration), and signals the transmission of the additional ACK information.

Since the access point AP signals information indicating that the access point AP will further transmit an ACK MPDU, the fourth station to the fifth station STA4 to STA5 do not transmit data again.

The AP transmits, to the fourth station STA4, a BA frame indicating whether the data transmitted from the fourth station STA4 is received or not. At this time, the access point AP sets the duration size of the PPDU including the BA frame to a value smaller than a predetermined size (Max ACK Duration), and signals that there is no transmission of the additional ACK information.

The fifth station STA5 transmits data again to the access point AP.

The access point AP transmits a BA frame to the fifth station STA5.

There may be a method of setting a network allocation vector (NAV) as a method for increasing the transmission probability of control information. This will be described with reference to FIG. 21.

Figure 21:
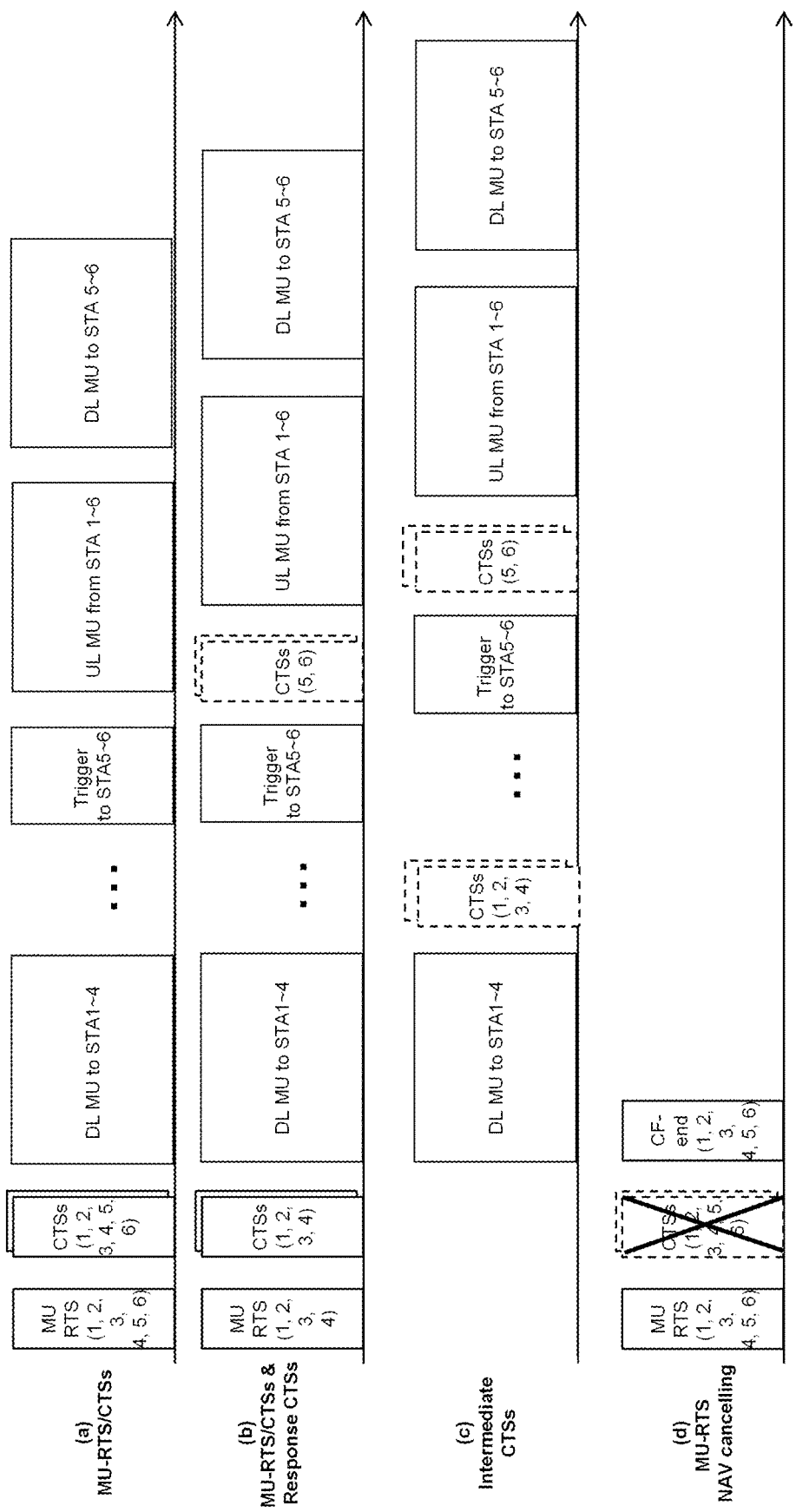
FIG. 21 shows a method of a wireless communication terminal to set a network allocation vector (NAV) for communication with a plurality of wireless communication terminals according to an embodiment of the present invention.

FIG. 21 shows a method of a wireless communication terminal to set a network allocation vector (NAV) for communication with a plurality of wireless communication terminals according to an embodiment of the present invention.

The wireless communication terminal may set the NAV to prevent another wireless communication terminal from connecting to the wireless medium used for communication. The NAV allows a wireless communication terminal to reserve a specific wireless medium to be used. The NAV is set through a Multi User-Request To Send (MU-RTS) frame and a simultaneous Clear To Send (CTS) frame in the communication between the first wireless communication terminal and the plurality of second wireless communication terminals. Specifically, the first wireless communication terminal transmits an MU-RTS frame to a plurality of second wireless communication terminals that are to transmit data. The plurality of second wireless communication terminals simultaneously transmit the simultaneous CTS frames having the same format to the first wireless communication terminal. In such a case, the plurality of second wireless communication terminals set all the same size NAVs to the surrounding wireless communication terminals. For example, in the embodiment of FIG. 21(a), the access point AP transmits an MU-RTS frame to the first station STA1 to the sixth station STA6.

The first to sixth stations STA1 to STA6 transmit a simultaneous CTS frame to the access point AP. Through such MU-RTS frame and simultaneous CTS frame transmission, the access point AP and the first station STA1 to the sixth station STA6 set the NAV of the neighboring station. At this time, the first station STA1 to the sixth station STA4 all set the NAV of the same value. However, the first to fourth stations STA1 to STA4 receive data faster than the fifth to sixth stations STA5 to STA6. Thus, it may be inefficient for all stations to set a NAV of the same size.

Accordingly, the second wireless communication terminal may transmit the CTS frame at a necessary point within the cascading sequence. Accordingly, the plurality of second wireless communication terminals may set different NAVs to neighboring stations. Specifically, the first wireless communication terminal transmits an MU-RTS frame to a second wireless communication terminal that will first transmit data in the cascading sequence. Then, the first wireless communication terminal transmits the trigger frame before transmitting the data to the second wireless communication terminal that does not transmit the MU-RTS frame. The second wireless communication terminal receiving the trigger frame transmits the CTS frame based on the trigger frame. For example, in the embodiment of FIG. 21(b), the access point AP transmits an MU-RTS frame to the first station STA1 to the fourth station STA4.

The first to fourth stations STA1 to STA4 transmit a simultaneous CTS frame to the access point AP.

The access point AP transmits data to the first station to the fourth station STA1 to STA4.

Then, the access point AP transmits the trigger frame to the fifth station to the sixth station STA5 to STA6.

The fifth to sixth stations STA5 to STA6 transmit a simultaneous CTS frame to the access point AP.

At this time, the NAV of the CTS frame transmitted from the first station STA1 to the fourth station STA4 may be the same as the NAV of the CTS frame transmitted from the fifth station to the sixth station STA5 to STA6. In another specific embodiment, the NAV of the CTS frame transmitted from the first station to the fourth station STA1 to STA4 may be the time point until the data exchange ends between the first station to the fourth station STA1 to STA4 and the access point AP. Through this operation, the first to sixth stations STA1 to STA6 may set the NAV for each station.

In another specific embodiment, the second wireless communication terminal may set a NAV by transmitting a simultaneous CTS frame without being based on an MU-RTS frame at a necessary point within a cascading sequence. At this time, the second wireless communication terminal may transmit the simultaneous CTS frame based on the triggering information. Accordingly, the second wireless communication terminal may reduce the overhead due to the MU-RTS frame transmission. For example, in the embodiment of FIG. 21(c), the access point AP transmits the MU PPDU including trigger information to the first station STA1 to the fourth station STA4.

The first to fourth stations STA1 to STA4 transmit the simultaneous CTS frame to the access point AP based on the trigger information.

Then, the access point AP transmits the trigger frame to the fifth station to the sixth station STA5 to STA6.

The fifth to sixth stations STA5 to STA6 transmit the simultaneous CTS frame to the access point AP based on the trigger frame. Through this operation, the first to sixth stations STA1 to STA6 may set the NAV without receiving the MU-RTS frame.

In another specific embodiment, the first wireless communication terminal may cancel the NAV by transmitting a CF-End frame. Specifically, when there is no simultaneous CTS frame transmission for a predetermined time from when the first wireless communication terminal transmits the MU-RTS frame, the first wireless communication terminal may transmit the CF-End frame. For example, in the embodiment of FIG. 21(d), the access point AP transmits an MU-RTS frame to the first station to the sixth station STA1 to STA6. The access point AP does not receive the CTS frame from the first station to the sixth station STA1 to STA6. Then, the access point AP cancels the set NAV by transmitting the CF-End frame. Through this operation, the access point AP may prevent the surrounding wireless communication terminals from unnecessarily connecting to the wireless medium due to the preset NAV even when communication with the station is impossible.

The trigger information described above may be used for random access of a plurality of second wireless communication terminals. At this time, there is a need for a random access method that distributes the connection time points of the plurality of second wireless communication terminals and minimize the connection conflict between the second wireless communication terminals. This will be described with reference to FIG. 22.

Figure 22:
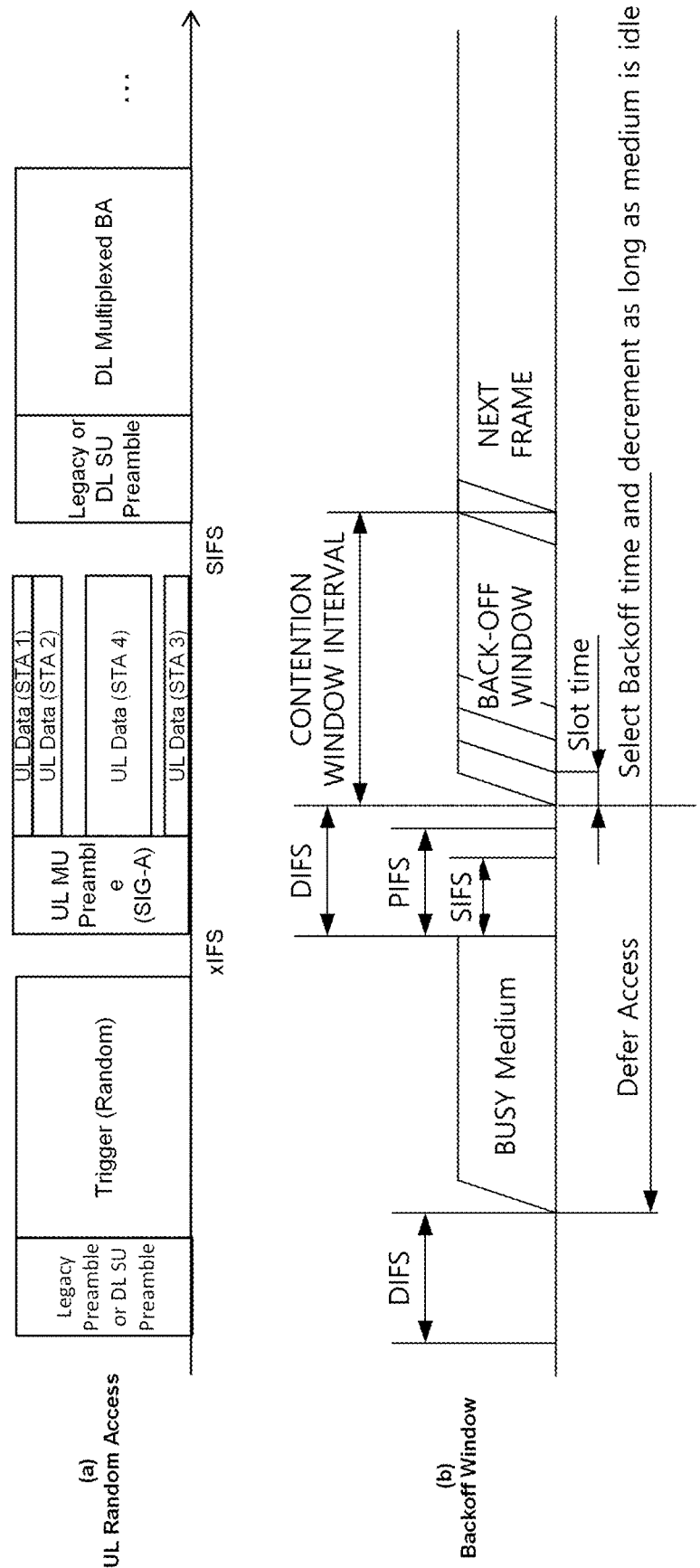
FIG. 22 shows that a wireless communication terminal according to an embodiment of the present invention performs random access based on a trigger frame.

FIG. 22 shows that a wireless communication terminal according to an embodiment of the present invention performs random access based on a trigger frame.

The RU allocation information included in the trigger frame may indicate an RU that is randomly accessible by a plurality of second wireless communication terminals. The plurality of second wireless communication terminals may be randomly accessed based on the trigger frame as in the embodiment of FIG. 22(a).

Specifically, the second wireless communication terminal may randomly obtain a counter value within a predetermined range, and determine whether to peform a random access based on the counter value. In addition, the second wireless communication terminal may determine whether to perform a random access based on the number of RUs allocated to the random access. This is because each of the plurality of second wireless communication terminals may access each RU.

Specifically, the second wireless communication terminal randomly obtains the counter value within a certain range, and when the counter value is smaller than the number of RUs allocated to the random access, the second wireless communication terminal may randomly access the RU allocated to the random access. If the counter value is not smaller than the number of RUs assigned to the random access, the second wireless communication terminal sets the counter value to a value obtained by subtracting the number of RUs allocated to the random access from the counter value. If the obtained counter value is smaller than the number of RUs assigned to the random access, the second wireless communication terminal may randomly access the RUs assigned to the random access. If the counter value is not smaller than the number of RUs assigned to the random access, the second wireless communication terminal repeats the same process when receiving the next trigger MPDUMPDU. At this time, the second wireless communication terminal maintains the counter value until the next trigger frame is transmitted.

If the random access is determined, the second wireless communication terminal may randomly select any one of the plurality of RUs assigned to the random access.

In yet another specific embodiment, the second wireless communication terminal may determine a random access by computing a random value for each RU assigned to the random access. At this time, the second wireless communication terminal may randomly access the RU whose random access is determined first. In yet another embodiment, the second wireless communication terminal may randomly access all RUs whose random access is determined first.

Also, the second wireless communication terminal may perform random access with higher probability as the back-off-window counter value is smaller. Specifically, the predetermined range for obtaining the above-described counter value may be the range of the backoff-window counter value. Also, in the case of determining random access by calculating a random value for each RU, the second wireless communication terminal may be determined to randomly access the RU with a higher probability as the backoff-window counter value is smaller. At this time, the second wireless communication terminal may obtain the backoff-window counter value as in the embodiment of FIG. 22(b).

Figure 23:
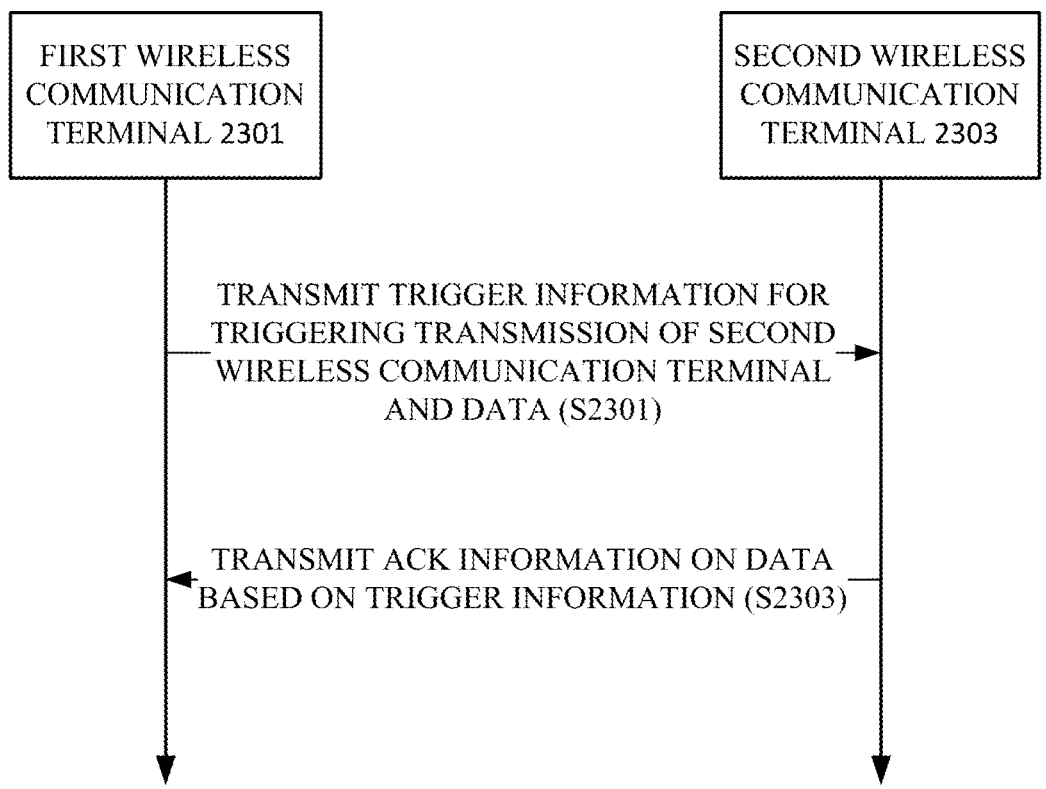
FIG. 23 shows the operation of a wireless communication terminal according to an embodiment of the present invention.

FIG. 23 shows the operation of a wireless communication terminal according to an embodiment of the present invention.

Through the above-described embodiments, the first wireless communication terminal 2301 may transmit control information. Specifically, the first wireless communication terminal 2301 may transmit trigger information and data for triggering transmission of the second wireless communication terminal 2303 to the plurality of second wireless communication terminals 2303 (S2301). The trigger information may include information on a resource unit (RU) assigned to the plurality of second wireless communication terminals 2303 and information indicating the length of a PPDU transmittable from the second wireless communication terminal 2303. The RU indicates a unit of a frequency band allocated to the second wireless communication terminal by the first wireless communication terminal.

Specifically, the first wireless communication terminal 2301 may transmit the trigger information to the plurality of second wireless communication terminals 2303 through the MAC header included in the MPDU. At this time, the MPDU may be a data MPDU including data.

In another specific embodiment, the first wireless communication terminal 2301 may transmit the A-MPDU including the data MPDU with the data and the trigger MPDUMPDU to the plurality of second wireless communication terminals 2303. At this time, the trigger MPDU may be the first MPDU among a plurality of MPDUs included in the A-MPDU. As described above, when the A-MPDU includes both the trigger MPDU and the BA MPDU, the BA MPDU may be the first MPDU among the plurality of MPDUs included in the A-MPDU. In addition, the A-MPDU may include a plurality of trigger MPDUs including the same trigger information.

In a specific embodiment, the first wireless communication terminal 2301 may transmit trigger information to the plurality of second wireless communication terminals 2303 as in the embodiment described with reference to FIG. 8 to FIG. 16.

The second wireless communication terminal 2303 receives the trigger information from the first wireless communication terminal 2301, and transmits the ACK information for the data based on the trigger information (S2303). Specifically, the second wireless communication terminal 2303 may acquire the trigger information from the MAC header of the MPDU transmitted from the first wireless communication terminal 2301. At this time, the second wireless communication terminal 2303 may acquire the information on the RU assigned to the second wireless communication terminal 2303 from the trigger information, and based on the information on the RU allocated to the second wireless communication terminal 2303, may transmit the ACK information. The second wireless communication terminal 2303 may acquire length information indicating the length of a PLCP Protocol Data Unit (PPDU) including ACK information from the trigger information, and may transmit ACK information based on the length information. The second wireless communication terminal 2303 may transmit ACK information and data based on the length information. In a specific embodiment, the second wireless communication terminal 2303 may transmit data based on the remaining length excluding the length required to transmit the ACK information from the length indicated by the length information. Also, the second wireless communication terminal may transmit the management MPDU together with the ACK information instead of the data. At this time, the ACK information may be ACK MPDU or BA MPDU.

When the second wireless communication terminal 2303 transmits ACK information and data together, the first wireless communication terminal 2301 may transmit ACK information to the plurality of second wireless communication terminals 2301. At this time, the first wireless communication terminal 2301 may transmit ACK information as in the embodiment described with reference to FIG. 20.

The trigger information as described above may represent a frequency band allocated for random access. Specifically, the trigger information may include information indicating one or more RUs assigned to a random access. The second wireless communication terminal 2303 may randomly obtain a counter value within a certain range and determine whether to perform a random access based on the counter value and the number of one or a plurality of RUs allocated to the random access. When the random access is determined, the second wireless communication terminal 2303 may randomly access any one of the one or more RUs assigned to the random access. Specifically, the second wireless communication terminal 2303 may perform random access based on the trigger information according to the embodiment described with reference to FIG. 22.

In addition, the first wireless communication terminal 2301 and the second wireless communication terminal 2303 may perform the recovery procedure according to the embodiments described with reference to FIGS. 17 to 19 in the cascading sequence.

Further, the first wireless communication terminal 2301 and the second wireless communication terminal 2303 may set the NAV as in the embodiment described with reference to FIG. 21 when data is transmitted based on the trigger information.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A base wireless communication terminal that wirelessly communicates with a plurality of wireless communication terminal, the base wireless communication terminal comprising:
   a transceiver; and
   a processor,
   wherein the processor is configured to
      transmit an Aggregate-MAC Protocol Data Unit (A-MPDU) comprising a trigger MPDU including trigger information and one or more data MPDUs including data to a wireless communication terminal by using the transceiver, wherein the trigger information triggers an uplink (UL) transmission of the wireless communication terminal to the base wireless communication terminal and includes information on a resource unit (RU) allocated for the UL transmission of the wireless communication terminal, and
      receive ACK information indicating that the data is received, wherein the ACK information is transmitted from the wireless communication terminal based on the information on the RU,
   wherein the A-MPDU is capable of including a plurality of trigger MPDUs including the trigger information.

2. The base wireless communication terminal of claim 1, wherein when the A-MPDU includes the plurality of trigger MPDUs, the processor is configured to transmit one of the plurality of the trigger MPDUs first among the plurality of the trigger MPDUs and one or more data MPDUs.

3. The base wireless communication terminal of claim 1, wherein when the A-MPDU includes the plurality of trigger MPDUs, each of the plurality of trigger MPDUs includes the same trigger information.

4. The base wireless communication terminal of claim 1, wherein the processor is configured to transmit a PLCP Protocol Data Unit (PPDU) including the A-MPDU to the wireless communication terminal and other wireless communication terminal, and
   allocate, by using the trigger information, a frequency band to the wireless communication terminal, wherein the frequency band is included in a frequency band through which the PPDU is transmitted.

5. The base wireless communication terminal of claim 1, wherein the processor is configured to insert the trigger information into a MAC header of the one or more data MPDUs.

6. The base wireless communication terminal of claim 1, wherein the processor is configured to set an ACK policy of the one or more data MPDUs to be a value which indicates that an immediate response is needed,
   transmit a PLCP Protocol Data Unit (PPDU) including the A-MPDU to the wireless communication terminal and other wireless communication terminal, and
   receive the ACK information, within a predetermined time from a time point at the end of transmitting the PPDU, simultaneously with receiving ACK information from the other wireless communication terminal.

7. A wireless communication terminal that wirelessly communicates with a base wireless communication terminal, the wireless communication terminal comprising:
   a transceiver; and
   a processor,
   wherein the processor is configured to
      obtain trigger information from an Aggregate-MAC Protocol Data Unit (A-MPDU) when the wireless communication terminal receives the A-MPDU comprises a trigger MPDU including the trigger information and one or more data MPDUs including data from the base wireless communication terminal by using the transceiver, wherein the trigger information triggers an uplink (UL) transmission of the wireless communication terminal to the base wireless communication terminal and includes information on a resource unit (RU) allocated for the UL transmission of the wireless communication terminal, and
      transmits ACK information indicating that the data is received to the base wireless communication terminal based on the information on the RU,
   wherein the A-MPDU is capable of including a plurality of trigger MPDUs including the trigger information.

8. The wireless communication terminal of claim 7, wherein when the A-MPDU includes the plurality of trigger MPDUs, one of the plurality of trigger MPDUs is the first MPDU among the plurality of trigger MPDUs and one or more data MPDUs,
   wherein the processor is configured to obtain the trigger information from the first MPDU among the plurality of trigger MPDUs and one or more data MPDUs.

9. The wireless communication terminal of claim 7, wherein when the A-MPDU includes the plurality of trigger MPDUs, each of the plurality of trigger MPDUs includes the same trigger information.

10. The wireless communication terminal of claim 7, wherein a PLCP Protocol Data Unit (PPDU) including the A-MPDU is transmitted to the wireless communication terminal and other wireless communication terminal, and
    wherein the processor is configured to transmit the ACK information through a frequency band which is included in a frequency band through which the PPDU is transmitted.

11. The wireless communication terminal of claim 7, wherein the one or more data MPDUs include a MAC header including the trigger information.

12. The wireless communication terminal of claim 7, wherein the trigger information comprises information indicating one or more Resource Unit (RU)s allocated to a random access,
    wherein the processor is configured to obtain a counter value randomly within a predetermined range, and determine whether to perform a random access based on the counter value and the number of the one or more RUs allocated to the random access.

13. The wireless communication terminal of claim 7, wherein the processor is configured to transmit the ACK information, through a RU indicated by the information on the RU, within a predetermined time from a time point at the end of receiving a PLCP Protocol Data Unit (PPDU) including the A-MPDU.

14. A method of operating a wireless communication terminal that wirelessly communicates with a base wireless communication terminal, the method comprising:
    obtaining trigger information from an Aggregate-MAC Protocol Data Unit (A-MPDU) when the wireless communication terminal receives the A-MPDU comprises a trigger MPDU including the trigger information and one or more data MPDUs including data from the base wireless communication terminal by using the transceiver, wherein the trigger information triggers an uplink (UL) transmission of the wireless communication terminal to the base wireless communication terminal and includes information on a resource unit (RU) allocated for the UL transmission of the wireless communication terminal, and transmitting ACK information indicating that the data is received to the base wireless communication terminal based on the information on the RU, wherein the A-MPDU is capable of including a plurality of trigger MPDUs including the trigger information.

15. The method of claim 14, wherein when the A-MPDU includes the plurality of trigger MPDUs, one of the plurality of trigger MPDUs is the first MPDU among the plurality of trigger MPDUs and one or more data MPDUs, obtaining the trigger information from the A-MPDU comprises obtaining the trigger information from the first MPDU among the plurality of trigger MPDUs and one or more data MPDUs.

16. The method of claim 14, wherein when the A-MPDU includes the plurality of trigger MPDUs, each of the plurality of trigger MPDUs includes the same trigger information.

17. The method of claim 14, wherein a PLCP Protocol Data Unit (PPDU) including the A-MPDU is transmitted to the wireless communication terminal and other wireless communication terminal, and wherein the transmitting the ACK information comprises transmitting the ACK information through a frequency band which is included in a frequency band through which the PPDU is transmitted.

* * * * *

UNITED STATES PATENT AND TRADEMARK OFFICE
CERTIFICATE OF CORRECTION

PATENT NO. : 10,554,370 B2  
APPLICATION NO. : 15/898226  
DATED : February 4, 2020  
INVENTOR(S) : Juhyung Son, Jinsam Kwak and Geonjung Ko Page 1 of 1

It is certified that error appears in the above-identified patent and that said Letters Patent is hereby corrected as shown below:

In the Claims
In Claim 7, Column 36, Line 3, "which" should be added between "A-MPDU" and "comprises".
In Claim 14, Column 36, Line 61, "which" should be added between "A-MPDU" and "comprises".

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*